(12) United States Patent
Tabata et al.

(10) Patent No.: US 11,958,471 B2
(45) Date of Patent: Apr. 16, 2024

(54) FOUR-WHEEL DRIVE VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Koji Takaira, Okazaki (JP); Akinori Takahashi, Toyota (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 17/354,260

(22) Filed: Jun. 22, 2021

(65) Prior Publication Data

US 2021/0394739 A1  Dec. 23, 2021

(30) Foreign Application Priority Data

Jun. 23, 2020  (JP) .................................. 2020-108277

(51) Int. Cl.
*B60K 23/08* (2006.01)
*B60K 6/24* (2007.10)
(Continued)

(52) U.S. Cl.
CPC ............... *B60W 20/15* (2016.01); *B60K 6/24* (2013.01); *B60K 6/26* (2013.01); *B60K 17/02* (2013.01);
(Continued)

(58) Field of Classification Search
CPC .......... B60W 20/15; B60K 6/24; B60K 6/26; B60K 6/543; B60K 6/547; B60K 17/02;
(Continued)

(56) References Cited

U.S. PATENT DOCUMENTS

2010/0089199 A1    4/2010  Lafer et al.
2011/0079454 A1*   4/2011  Maguire ................. B60L 58/21
                                                    180/65.21
(Continued)

FOREIGN PATENT DOCUMENTS

JP    2010-151309 A    7/2010
JP    2016-061414 A    4/2016
JP    2019-018692 A    2/2019

*Primary Examiner* — Gonzalo Laguarda
(74) *Attorney, Agent, or Firm* — Oblon, McClelland, Maier & Neustadt, L.L.P.

(57) ABSTRACT

A four-wheel drive vehicle includes: a drive-power distribution device for distributing a drive power from an engine to main and auxiliary drive wheels with a drive-power distribution ratio between the main drive wheels and auxiliary drive wheels; and a control apparatus for controlling an electric motor such that the drive-power distribution ratio becomes a target distribution ratio value, by setting an electric-current command value for driving an electric motor. The control apparatus is configured, in a drive-power transmitted state in which the drive power is transmitted to the drive-power distribution device, to execute a command-value reduction control operation for causing the electric motor to be driven with the electric-current command value being set to a value smaller than in a drive-power non-transmitted state in which the drive power is not being transmitted to the drive-power distribution device.

7 Claims, 10 Drawing Sheets

(51) Int. Cl.
  *B60K 6/26* (2007.10)
  *B60K 17/02* (2006.01)
  *B60K 17/12* (2006.01)
  *B60K 17/35* (2006.01)
  *B60K 23/00* (2006.01)
  *B60K 25/08* (2006.01)
  *B60W 20/15* (2016.01)
  B60K 6/543 (2007.10)
  B60K 6/547 (2007.10)
  F16D 28/00 (2006.01)

(52) U.S. Cl.
  CPC .............. *B60K 17/12* (2013.01); *B60K 17/35* (2013.01); *B60K 23/00* (2013.01); *B60K 25/08* (2013.01); *B60K 6/543* (2013.01); *B60K 6/547* (2013.01); *B60K 23/0808* (2013.01); *F16D 28/00* (2013.01)

(58) Field of Classification Search
  CPC ........ B60K 17/12; B60K 17/35; B60K 23/00; B60K 25/08; B60K 23/0808
  See application file for complete search history.

(56) References Cited

U.S. PATENT DOCUMENTS

| | | |
|---|---|---|
| 2019/0017557 A1 | 1/2019 | Arai et al. |
| 2021/0354682 A1* | 11/2021 | Takaira .................... F16H 3/66 |
| 2022/0250470 A1* | 8/2022 | Wenthen ............ B60K 17/3467 |
| 2023/0076997 A1* | 3/2023 | Bai ........................ B60K 6/387 |

* cited by examiner

PU: 12, MG1, MG2

CB: C1、C2、B1、B2

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

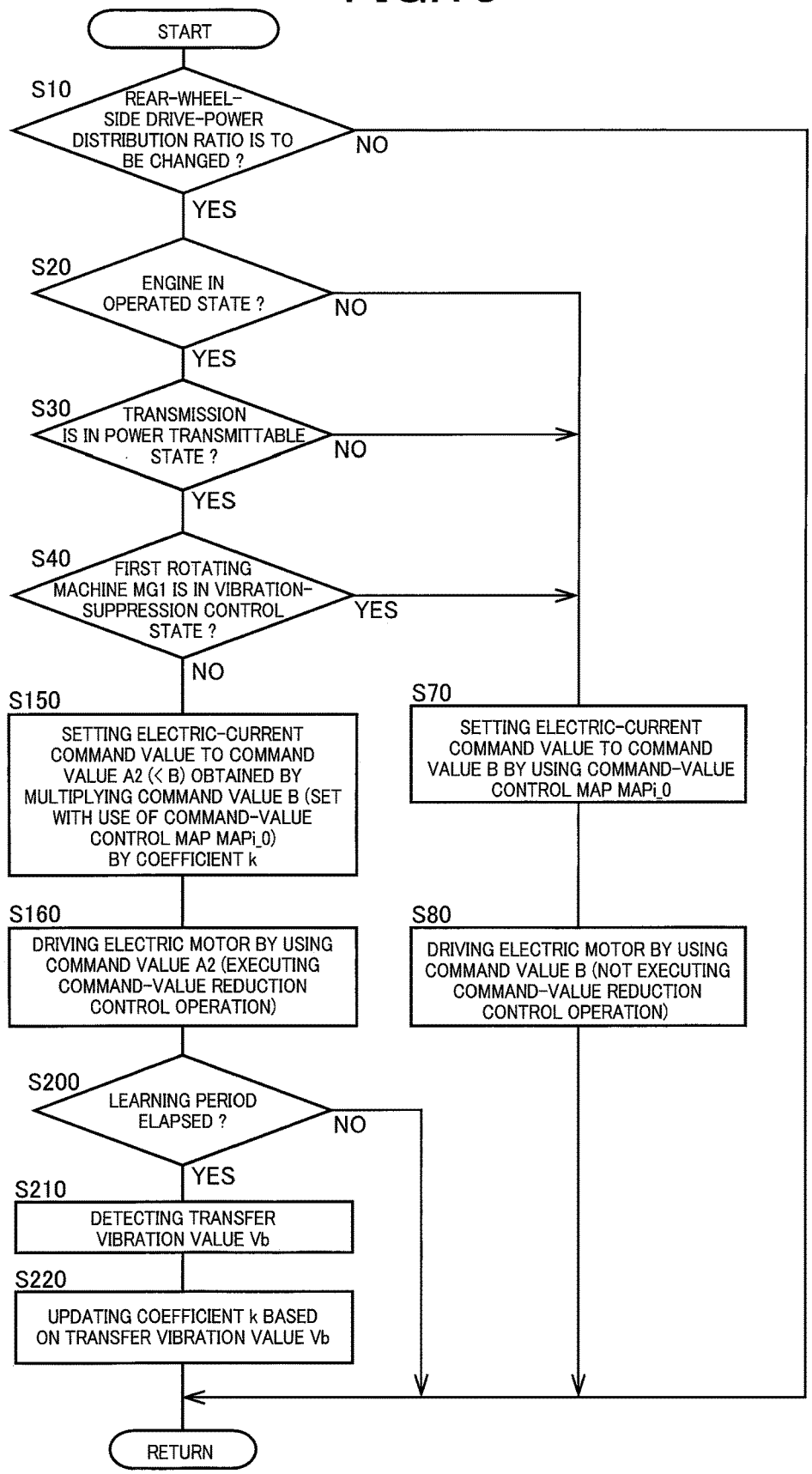

FOUR-WHEEL DRIVE VEHICLE

This application claims priority from Japanese Patent Application No. 2020-108277 filed on Jun. 23, 2020, the disclosure of which is herein incorporated by reference in its entirety.

FIELD OF THE INVENTION

The present invention relates to a four-wheel drive vehicle in which a ratio of distribution of a drive power between main and auxiliary drive wheels is changeable.

BACKGROUND OF THE INVENTION

There is well-known a four-wheel drive vehicle including: main drive wheels and auxiliary drive wheels; at least one drive power source including an engine; and a drive-power distribution device including (i) a drive-power distribution clutch configured to distribute a drive power from the at least one drive power source to the main drive wheels and the auxiliary drive wheels, (ii) a worm-drive electric motor, (iii) a gear mechanism including (iii-1) a worm provided on a shaft of the worm-drive electric motor and (iii-2) a worm wheel meshing with the worm and (iv) a conversion mechanism configured to cause the drive-power distribution clutch to generate a pressing force by converting a rotary motion of the electric motor into a linear motion in a direction of an axis of the drive-power distribution clutch. A four-wheel drive vehicle disclosed in JP-2010-151309A is an example of such a vehicle.

SUMMARY OF THE INVENTION

In the four-wheel drive vehicle disclosed in the above-identified Japanese Patent Application Publication, a rotation angle of the worm-drive electric motor is controlled such that a drive-power distribution ratio, which is a ratio of distribution of the drive power between the auxiliary drive wheels and the main drive wheels, becomes a target distribution ratio value. That is, when the drive-power distribution ratio is to be changed to the target distribution ratio value, an electric-current command value for the worm-drive electric motor is determined or set such that the rotation angle of the worm-drive electric motor becomes a target angle value that realizes the target distribution ratio value of the drive-power distribution ratio, so that the worm-drive electric motor is driven and rotated in accordance with the set electric-current command value whereby the drive-power distribution ratio is controlled to the target distribution ratio value. By the way, since a degree of easiness of rotation of the worm wheel varies depending on vibration applied to the drive-power distribution device, there is a risk that the rotation angle of the driven and rotated worm-drive electric motor could be deviated from the target angle value, namely, the drive-power distribution ratio could be deviated from the target distribution ratio value, depending on a vibrational state of the drive-power distribution device. In connection with this issue, since the vibrational state of the drive-power distribution device varies depending on whether or not the drive power from the engine is being transmitted to the drive-power distribution device, there is a room for improvement in this point, for increasing an accuracy of control of the drive-power distribution ratio.

The present invention was made in view of the background art described above. It is therefore an object of the present invention to provide a four-wheel drive vehicle capable of suppressing reduction in control accuracy of a drive-power distribution ratio even when vibrational state of a drive-power distribution device is changed by transmission of a drive power from an engine to the drive-power distribution device.

The object indicated above is achieved according to the following aspects of the present invention.

According to a first aspect of the invention, there is provided a four-wheel drive vehicle comprising: (a) main drive wheels and auxiliary drive wheels; (b) at least one drive power source including an engine; (c) a drive-power distribution device including (c-i) a drive-power distribution clutch configured to distribute a drive power from the at least one drive power source to the main drive wheels and the auxiliary drive wheels, with a drive-power distribution ratio that is a ratio of distribution of the drive power between the auxiliary drive wheels and the main drive wheels, (c-ii) a worm-drive electric motor, (c-iii) a gear mechanism including (c-iii-1) a worm provided on a shaft of the worm-drive electric motor and (c-iii-2) a worm wheel meshing with the worm and (c-iv) a conversion mechanism configured to cause a pressing force to be generated in the drive-power distribution clutch by converting a rotary motion of the worm-drive electric motor into a linear motion in a direction of an axis of the drive-power distribution clutch; and (d) a control apparatus configured to control rotation of the worm-drive electric motor such that the drive-power distribution ratio becomes a target distribution ratio value, wherein the control apparatus is configured, when changing the drive-power distribution ratio to the target distribution ratio value, to set an electric-current command value for driving and rotating the worm-drive electric motor, such that the electric-current command value is set depending on whether the drive power from the engine is being transmitted to the drive-power distribution device or not, and wherein the control apparatus is configured, in a drive-power transmitted state in which the drive power from the engine is being transmitted to the drive-power distribution device, to execute a command-value reduction control operation for causing the worm-drive electric motor to be driven and rotated, with the electric-current command value being set to a value smaller than in a drive-power non-transmitted state in which the drive power from the engine is not being transmitted to the drive-power distribution device.

According to a second aspect of the invention, in the four-wheel drive vehicle according to the first aspect of the invention, there is provided a transmission provided between the engine and the drive-power distribution device, wherein the control apparatus is configured to execute the command-value reduction control operation when the transmission is in a state in which the drive power is transmittable through the transmission.

According to a third aspect of the invention, in the four-wheel drive vehicle according to the first or second aspect of the invention, the at least one drive power source includes a vehicle-drive rotating machine, wherein the control apparatus is configured to not execute the command-value reduction control operation when the vehicle-drive rotating machine is in a vibration-suppression control state for suppressing a pulsating component contained in the drive power from the engine, and is configured to execute the command-value reduction control operation when the vehicle-drive rotating machine is not in the vibration-suppression control state.

According to a fourth aspect of the invention, in the four-wheel drive vehicle according to any one of the first through third aspects of the invention, the control apparatus is configured to not execute the command-value reduction control operation in a case in which the drive-power distribution ratio is not changed even when the drive-power non-transmitted state is switched to the drive-power transmitted state.

According to a fifth aspect of the invention, in the four-wheel drive vehicle according to any one of the first through fourth aspects of the invention, the control apparatus is configured to set the electric-current command value, by using control maps each of which defines a relationship between the target distribution ratio value and the electric-current command value, such that one of the control maps is used to set the electric-current command value in the drive-power transmitted state, and such that another one of the control maps, which is different from the one of the control maps, is used to set the electric-current command value in the drive-power non-transmitted state.

According to a sixth aspect of the invention, in the four-wheel drive vehicle according to any one of the first through forth aspects of the invention, the control apparatus is configured, in the drive-power non-transmitted state, to set the electric-current command value to a first command value, wherein the control apparatus is configured, when executing the command-value reduction control operation, to set the electric-current command value to a second command value that is obtained by multiplying the first command value with a coefficient.

According to a seventh aspect of the invention, in the four-wheel drive vehicle according to the sixth aspect of the invention, the control apparatus is configured to change the coefficient through a learning based on a vibration value of the drive-power distribution device.

In the four-wheel drive vehicle according to the first aspect of the invention, the control apparatus is configured, when changing the drive-power distribution ratio to the target distribution ratio value, to set the electric-current command value for driving and rotating the worm-drive electric motor, such that the electric-current command value is set depending on whether the drive power from the engine is being transmitted to the drive-power distribution device or not, wherein the control apparatus is configured, in the drive-power transmitted state in which the drive power from the engine is being transmitted to the drive-power distribution device, to execute the command-value reduction control operation for causing the worm-drive electric motor to be driven and rotated, with the electric-current command value being set to a value smaller than in the drive-power non-transmitted state in which the drive power from the engine is not being transmitted to the drive-power distribution device.

In the drive-power transmitted state in which the drive power from the engine is being transmitted to the drive-power distribution device, vibration applied to the drive-power distribution device is larger than in the drive-power non-transmitted state in which the drive power from the engine is not being transmitted to the drive-power distribution device. When the vibration applied to the drive-power distribution device is large, the worm-drive electric motor is more easily driven and rotated, than when the vibration is small. Therefore, in the drive-power transmitted state, the electric-current command value for driving and rotating the worm-drive electric motor is set to a value smaller than in the drive-power non-transmitted state. Thus, the electric-current command value is determined or set depending on a vibrational state of the drive-power distribution device, thereby making it to possible to suppress reduction of the control accuracy of the drive-power distribution ratio even when the vibrational state of the drive-power distribution device is changed.

In the four-wheel drive vehicle according to the second aspect of the invention, the transmission is provided between the engine and the drive-power distribution device, wherein the command-value reduction control operation is executed when the transmission is in the state in which the drive power is transmittable through the transmission. Thus, the command-value reduction control operation is executed depending on whether the vibration due to transmission of the drive power from the engine to the drive-power distribution device is present or absent, thereby making it to possible to suppress the reduction of the control accuracy of the drive-power distribution ratio.

In the four-wheel drive vehicle according to the third aspect of the invention, the at least one drive power source includes the vehicle-drive rotating machine, wherein the command-value reduction control operation is not executed when the vehicle-drive rotating machine is in the vibration-suppression control state for suppressing the pulsating component contained in the drive power from the engine, and is executed when the vehicle-drive rotating machine is not in the vibration-suppression control state. Thus, in a case in which transmission of the vibration due to transmission of the drive power from the engine to the drive-power distribution device is not suppressed by the control state of the vehicle-drive rotating machine, the command-value reduction control operation is executed, thereby making it to possible to suppress the reduction of the control accuracy of the drive-power distribution ratio In the four-wheel drive vehicle according to the fourth aspect of the invention, the command-value reduction control operation is not executed in the case in which the drive-power distribution ratio is not changed even when the drive-power non-transmitted state is switched to the drive-power transmitted state. When the drive-power non-transmitted state is switched to the drive-power transmitted state, the vibration applied to the drive-power distribution device is increased whereby the worm-drive electric motor becomes easier to be driven and rotated. However, even when the drive-power non-transmitted state is switched to the drive-power transmitted state, in a case in which the drive-power distribution ratio is not changed, the rotation angle of the worm-drive electric motor is not changed and accordingly the worm-drive electric motor is neither driven nor rotated, so that there is no need for execution of the command-value reduction control operation.

In the four-wheel drive vehicle according to the fifth aspect of the invention, the electric-current command value is set, by using the control maps each of which defines the relationship between the target distribution ratio value and the electric-current command value, such that one of the control maps is used to set the electric-current command value in the above-described drive-power transmitted state, and such that another one of the control maps, which is different from the one of the control maps, is used to set the electric-current command value in the above-described drive-power non-transmitted state. Thus, with use of one of the control maps, which is selected depending on which one of the drive-power transmitted state and the drive-power non-transmitted state is being established, it is possible to quickly determine or set the electric-current command value for driving and rotating the worm-drive electric motor so as to cause the drive-power distribution ratio to become the target distribution ratio value. Further, the determination or setting of the electric-current command value can be made with a reduced computational load.

In the four-wheel drive vehicle according to the sixth aspect of the invention, the electric-current command value is set to the first command value in the drive-power non-transmitted state, wherein, when the command-value reduction control operation is to be executed, the electric-current command value is set to the second command value that is obtained by multiplying the first command value with a coefficient. Thus, as compared with an arrangement in which a control map used in the drive-power transmitted state is pre-stored in a storage portion, a required capacity of a storage portion can be made smaller, as long as the coefficient can be stored in the storage portion.

In the four-wheel drive vehicle according to the seventh aspect of the invention, the coefficient is changed through the learning based on the vibration value of the drive-power distribution device. The vibrational state of the drive-power distribution device varies depending on a degree of easiness of transmission of the vibration from the engine to the drive-power distribution device in each four-wheel drive vehicle. Therefore, the reduction of the control accuracy of the drive-power distribution ratio is more suppressed owing to change of the coefficient through the learning, as compared with in an arrangement in which the coefficient is not changed through the learning.

BRIEF DESCRIPTION OF THE DRAWINGS

FIG. 13 is a flow chart showing, by way of example, a main part of a control routine executed by an electronic control apparatus shown in FIG. 10.

DETAILED DESCRIPTION OF PREFERRED EMBODIMENTS

Hereinafter, preferred embodiments of the invention will be described in detail with reference to the accompanying drawings. It is noted that figures of the drawings are simplified or deformed as needed and portions are not necessarily precisely depicted in terms of dimension ratio, shape, etc.

First Embodiment

Figure 1:
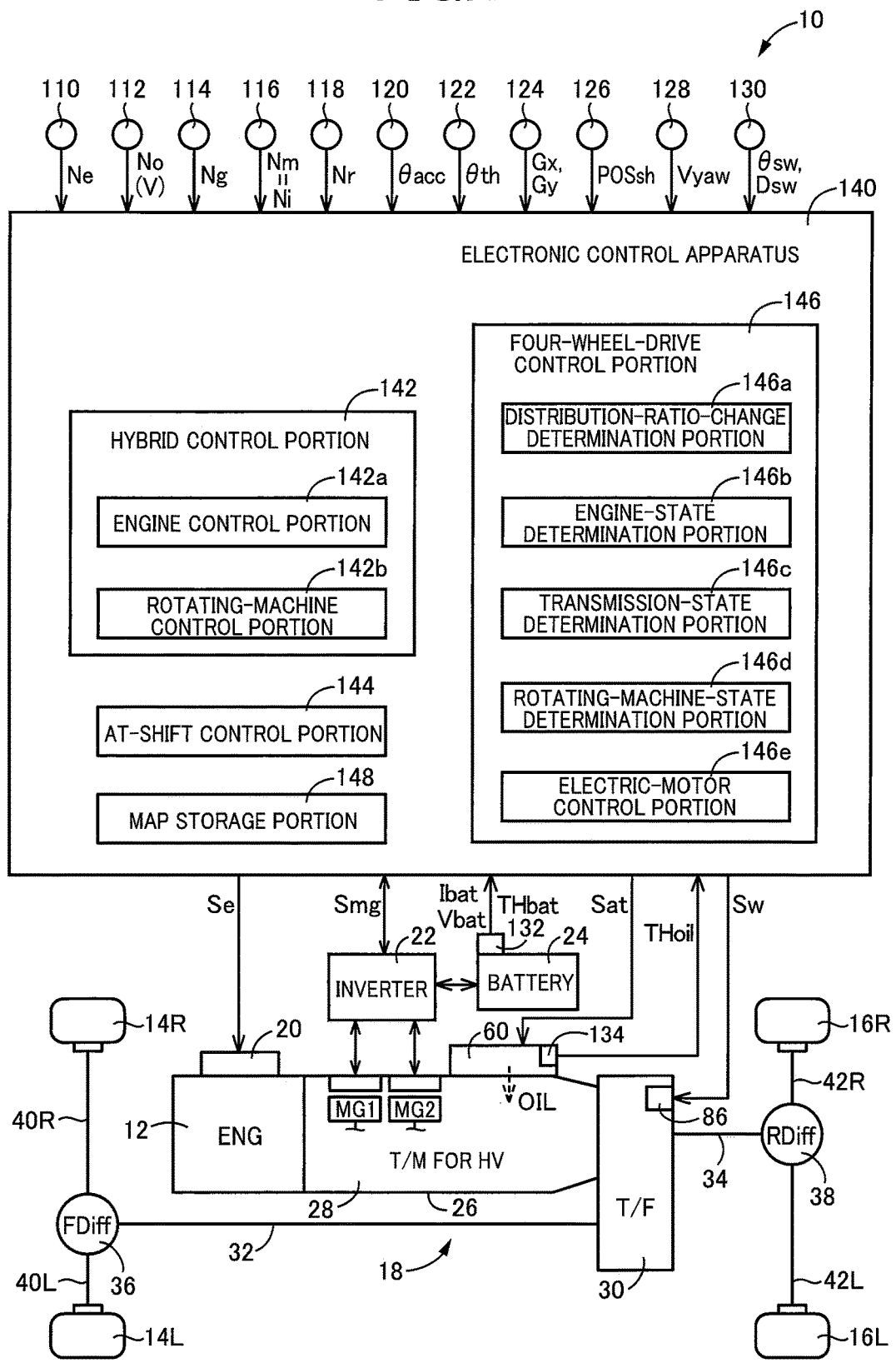
FIG. 1 is a view schematically showing a construction of a four-wheel drive vehicle constructed according to a first embodiment of the present invention, for explaining major portions of control functions that are provided to perform various control operations in the vehicle.

FIG. 1 is a view schematically showing a construction of a four-wheel drive vehicle 10 constructed according to a first embodiment of the present invention, for explaining major portions of control functions that are provided to perform various control operations in the vehicle 10.

The four-wheel drive vehicle 10 is a hybrid vehicle including drive power sources in the form of an engine 12 (see "ENG" in FIG. 1), a first rotating machine MG1 and a second rotating machine MG2. Thus, the vehicle 10 includes at least one drive power source PU including the engine 12. The vehicle 10 further includes right and left front wheels 14R, 14L, right and left rear wheels 16R, 16L and a power transmission apparatus 18 that is configured to transmit a drive power from the engine 12 to the right and left front wheels 14R, 14L and the right and left rear wheels 16R, 16L. The vehicle 10 is a four-wheel drive vehicle based on a vehicle of FR (front engine and rear drive) system. The rear wheels 16R, 16L serve as drive wheels during a four-wheel drive running of the vehicle 10 but also during a two-wheel drive running of the vehicle 10, and correspond to "main drive wheels" recited in the appended claims. The front wheels 14R, 14L serve as driven wheels during the two-wheel drive running and serve as the drive wheels during the four-wheel drive running, and correspond to "auxiliary drive wheels" recited in the appended claims. In the following description, the front wheels 14R, 14L will be referred to as "front wheels 14" and the rear wheels 16R, 16L will be referred to as "rear wheels 16", unless they are to be distinguished from each other. Further, each of the engine 12, first rotating machine MG1 and second rotating machine MG2 will be referred to as "drive power source PU", unless they are to be distinguished from one another.

The engine 12 is one of the drive power sources PU for driving the four-wheel drive vehicle 10 to run, and is a known internal combustion engine such as gasoline engine and diesel engine. The vehicle 10 is provided with an engine control device 20 that includes a throttle actuator, a fuel injection device and an ignition device. With the engine control device 20 being controlled by an electronic control apparatus 140 that is described below, an engine torque Te [Nm], which is an output torque of the engine 12, is controlled.

Each of the first and second rotating machines MG1, MG2 is a rotating electric machine having a function serving as an electric motor and a function serving as a generator. That is, each of the first and second rotating machines MG1, MG2 is a so-called "motor generator". Each of the first and second rotating machines MG1, MG2 is a rotating machine that can serve as the drive power source PU for driving the four-wheel drive vehicle 10 to run, and corresponds to "vehicle-drive rotating machine" recited in the appended claims. The first and second rotating machines MG1, MG2 are connected to a battery 24 provided in the vehicle 10, through an inverter 22 provided in the vehicle 10. The inverter 22 is controlled by the electronic control apparatus 140 whereby an MG1 torque Tg [Nm] and an MG2 torque Tm [Nm] as output torques of the respective first and second rotating machines MG1, MG2 are controlled. The output torque of each of the first and second rotating machines MG1, MG2 serves as a power running torque when acting as a positive torque for acceleration of the vehicle 10, with the each of the first and second rotating machines MG1, MG2 being rotated in a forward direction. The output torque of each of the first and second rotating machines MG1, MG2 serves as a regenerative torque when acting as a negative torque for deceleration of the vehicle 10, with the each of the first and second rotating machines MG1, MG2 being rotated in the forward direction. The battery 24 is an electric storage device to and from which an electric power is supplied from and to the first rotating machine MG1 and the second rotating machine MG2. The first and second rotating machines MG1, MG2 are disposed inside a casing 26 as a non-rotary member that is attached to a body of the vehicle 10.

The power transmission apparatus 18 includes an automatic transmission 28 (see "T/M FOR HV" in FIG. 1) that is a transmission for hybrid system, a transfer 30 (see "T/F" in FIG. 1), a front propeller shaft 32, a rear propeller shaft 34, a front-wheel-side differential gear device 36 (see "FDiff" in FIG. 1), a rear-wheel-side differential gear device 38 (see "RDiff" in FIG. 1), right and left front axles 40R, 40L and right and left rear axles 42R, 42L, so that the drive power from the engine 12, example, is to be transmitted to the rear wheels 16R, 16L sequentially through the transfer 30, rear propeller shaft 34, rear-wheel-side differential gear device 38 and right and left rear axles 42R, 42L, for example. When a part of the drive power transmitted to the transfer 30 from the engine 12 is distributed toward the front wheels 14R, 14L in the power transmission apparatus 18, the distributed part of the drive power is transmitted to the front wheels 14R, 14L sequentially through the front propeller shaft 32, front-wheel-side differential gear device 36 and right and left front axles 40R, 40L, for example.

Figures 2, 3:
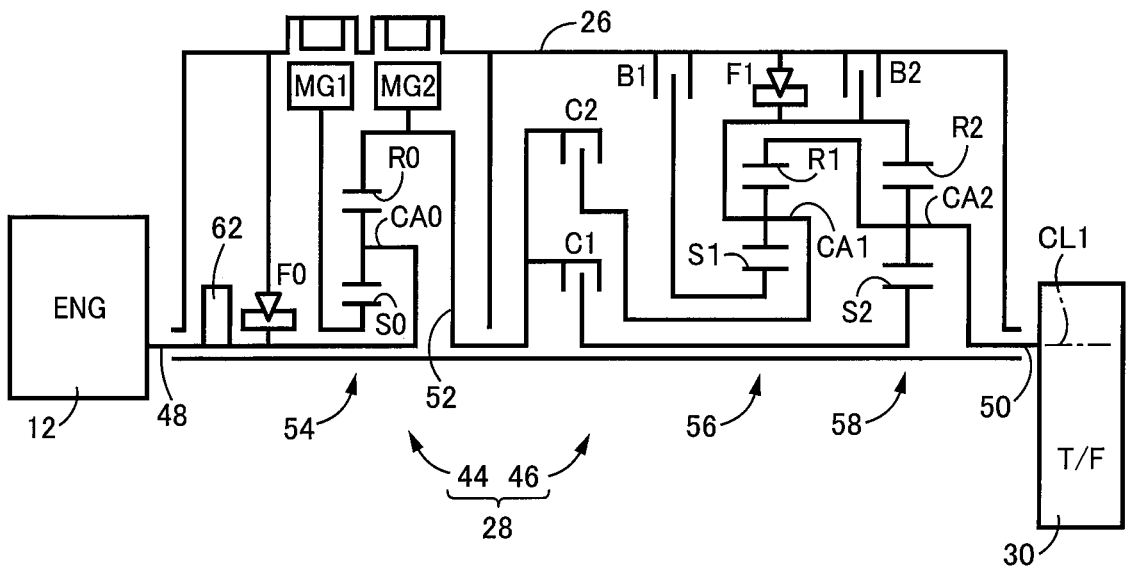
FIG. 2 is a view schematically showing a construction of an automatic transmission shown in FIG. 1.
FIG. 3 is a table indicating a relationship between each gear position of a mechanically-operated step-variable transmission portion (shown in FIG. 2) and a combination of engagement devices of the step-variable transmission portion, which are placed in engaged states to establish the gear position in the step-variable transmission portion.

FIG. 2 is a view schematically showing a construction of the automatic transmission 28. As shown in FIG. 2, the automatic transmission 28 includes an electrically-operated continuously-variable transmission portion 44 and a mechanically-operated step-variable transmission portion 46 that are disposed in series on a rotary axis CL1 that are common to the transmission portions 44, 46 within the casing 26. The electrically-operated continuously-variable transmission portion 44 is connected to the engine 12 directly or indirectly through, for example, a damper (not shown). The mechanically-operated step-variable transmission portion 46 is connected to an output rotary member of the electrically-operated continuously-variable transmission portion 44. The transfer 30 is connected to an output rotary member of the mechanically-operated step-variable transmission portion 46. In the automatic transmission 28, the drive power outputted from the engine 12 or the second rotating machine MG2, for example, is transmitted to the mechanically-operated step-variable transmission portion 46, and is then transmitted from the mechanically-operated step-variable transmission portion 46 to the transfer 30. In the following description, the electrically-operated continuously-variable transmission portion 44 and the mechanically-operated step-variable transmission portion 46 will be referred simply to as "continuously-variable transmission portion 44" and "step-variable transmission portion 46", respectively. The power corresponds to a torque and a force unless they are to be distinguished from one another.

Each of the continuously-variable transmission portion 44 and the step-variable transmission portion 46 is constructed substantially symmetrically about the rotary axis CL1, so that a lower half of each of the transmission portions 44, 46 is not shown in FIG. 2. The rotary axis CL1 corresponds to an axis of a crank shaft of the engine 12, an axis of a connection shaft 48 which is an input rotary member of the automatic transmission 28 and which is connected to the crank shaft of the engine 12, and an axis of an output shaft 50 which is an output rotary member of the automatic transmission 28. The connection shaft 48 serves also as an input rotary member of the continuously-variable transmission portion 44. The output shaft 50 serves also as an output rotary member of the step-variable transmission portion 46.

The continuously-variable transmission portion 44 is provided with: the above-described first rotating machine MG1; and a differential mechanism 54 serving as a drive-power distribution mechanism to mechanically distribute the drive power from the engine 12 to the first rotating machine MG1 and to an intermediate transmission member 52 that is an output rotary member of the continuously-variable transmission portion 44. The above-described second rotating machine is MG2 connected to the intermediate transmission member 52 in a power transmittable manner. The continuously-variable transmission portion 44 is an electrically-operated continuously-variable transmission wherein a differential state of the differential mechanism 54 is controllable by controlling an operation state of the first rotating machine MG1. The continuously-variable transmission portion 44 is operated as the electrically-operated continuously-variable transmission whose gear ratio (may be referred also to as "speed ratio") γ0 (=engine rotational speed Ne [rpm]/MG2 rotational speed Nm [rpm]) is to be changed. The engine rotational speed Ne is a rotational speed of the engine 12, and is equal to an input rotational speed of the continuously-variable transmission portion 44, i.e., a rotational speed of the connection shaft 48. The engine rotational speed Ne is also an input rotational speed of the automatic transmission 28 that is constituted mainly by the continuously-variable transmission portion 44 and the step-variable transmission portion 46. The MG2 rotational speed Nm is a rotational speed of the second rotating machine MG2, and is equal to an output rotational speed of the continuously-variable transmission portion 44, i.e., a rotational speed of the intermediate transmission member 52. The first rotating machine MG1 is a rotating machine capable of controlling the engine rotational speed Ne. It is noted that controlling an operation state of the first rotating machine MG1 is controlling the operation of the first rotating machine MG1.

The differential mechanism 54 is a planetary gear device of a single-pinion type having a sun gear S0, a carrier CA0 and a ring gear R0. The carrier CA0 is connected to the engine 12 through the connection shaft 48 in a drive-power transmittable manner, and the sun gear S0 is connected to the first rotating machine MG1 in a drive-power transmittable manner, and the ring gear R0 is connected to the second rotating machine MG2 in a drive-power transmittable manner. In the differential mechanism 54, the carrier CA0 serves as an input element, the sun gear S0 serves as a reaction element, and the ring gear R0 serves as an output element.

The step-variable transmission portion 46 is a step-variable transmission that constitutes a power transmission path between the intermediate transmission member 52 and the transfer 30. The intermediate transmission member 52 also serves as an input rotary member of the step-variable transmission portion 46. The second rotating machine MG2 is connected to the intermediate transmission member 52, so as to be rotated integrally with the intermediate transmission member 52. The step-variable transmission portion 46 is an automatic transmission that constitutes a part of a power transmission path between the drive power sources PU (for driving the four-wheel drive vehicle 10 to run) and the drive wheels (front and rear wheels 14, 16). The step-variable transmission portion 46 is a known automatic transmission of a planetary gear type provided with a plurality of planetary gear devices including first and second planetary gear devices 56, 58 and a plurality of engagement devices including a one-way clutch F1, a clutch C1, a clutch C2, a brake B1 and a brake B2. Hereinafter, the clutch C1, clutch C2, brake B1 and brake B2 will be referred to as "engagement devices CB" unless they are to be distinguished from one another.

Each of the engagement devices CB is a hydraulically-operated frictional engagement device constituted by, for example, a wet-type multiple-disc clutch including a plurality of friction plates which are superposed on each other and which are forced against each other by a hydraulic actuator, or a band brake including a rotary drum and one band or two bands which is/are wound on an outer circumferential surface of the rotary drum and tightened by a hydraulic actuator. The hydraulic actuator of each of the engagement devices CB receives a regulated hydraulic pressure supplied from a hydraulic control unit (hydraulic control circuit) 60 (see FIG. 1) that is provided in the four-wheel drive vehicle 10, whereby its operation state is switched between an engaged state and a released state, for example.

In the step-variable transmission portion 46, selected ones of rotary elements of the first and second planetary gear devices 56, 58 are connected to each other or to the intermediate transmission member 52, casing 26 or output shaft 50, either directly or indirectly through the engagement devices CB or the one-way clutch F1. The rotary elements of the first planetary gear device 56 are a sun gear S1, a carrier CA1 and a ring gear R1. The rotary elements of the second planetary gear device 58 are a sun gear S2, a carrier CA2 and a ring gear R2.

The step-variable transmission portion 46 is shifted to a selected one of a plurality of gear positions (speed positions) by engaging actions of selected ones of the engagement devices CB. The plurality of AT gear positions have respective different gear ratios (speed ratios) γat (=AT input rotational speed Ni [rpm]/output rotational speed No [rpm]). Namely, the step-variable transmission portion 46 is shifted up and down from one gear position to another by placing selected ones of the engagement devices into the engaged state. The step-variable transmission portion 46 is a step-variable automatic transmission configured to establish a selected one of the plurality of gear positions. In the following description of the present embodiment, the gear position established in the step-variable transmission portion 46 will be referred to as "AT gear position". The AT input rotational speed Ni is an input rotational speed of the step-variable transmission portion 46 that is a rotational speed of the input rotary member of the step-variable transmission portion 46, which is equal to a rotational speed of the intermediate transmission member 52, and which is equal to the MG2 rotational speed Nm. Thus, the AT input rotational speed Ni can be represented by the MG2 rotational speed Nm. The output rotational speed No is a rotational speed of the output shaft 50 that is an output rotational speed of the step-variable transmission portion 46, which is considered to be an output rotational speed of the automatic transmission 28. The automatic transmission 28 is an automatic transmission configured to transmit the drive power or powers from the drive power source or sources PU, to the output shaft 50. The automatic transmission 28 is disposed between the engine 12 and the transfer 30 in the power transmission path between the drive power sources PU and the drive wheels, and corresponds to "transmission" recited in the appended claims.

FIG. 3 is a table indicating a relationship between each AT gear position of mechanically-operated step-variable transmission portion 46 (shown in FIG. 2) and a combination of the engagement devices CB of the step-variable transmission portion 46, which are placed in engaged states to establish the AT gear position in the step-variable transmission portion 46. In the table of FIG. 3, "O" indicates the engaged state of the engagement devices CB, "A" indicates the engaged state of the brake B2 during application of an engine brake to the four-wheel drive vehicle 10 or during a coasting shift-down action of the step-variable transmission portion 46, and blank indicates the released state of the engagement devices CB. As shown in FIG. 3, the step-variable transmission portion 46 is configured to establish a selected one of a plurality of AT gear positions in the form of four forward AT gear positions and a reverse AT gear position, for example. The four forward AT gear positions consist of a first speed AT gear position, a second speed AT gear position, a third speed AT gear position and a fourth speed AT gear position, which are represented by "1st", "2nd", "3rd" and "4th" in the table of FIG. 3. The first speed AT gear position is the lowest-speed gear position having a highest gear ratio γat, while the fourth speed AT gear position is the highest-speed gear position having a lowest gear ratio γat. The reverse AT gear position is represented by "Rev" in the table of FIG. 3, and is established by, for example, engagements of the clutch C1 and the brake B2. That is, when the vehicle 10 is to run in reverse direction, the first speed AT gear position is established, for example.

The step-variable transmission portion 46 is configured to switch from one of the AT gear positions to another one of the AT gear positions, namely, to establish one of the AT gear positions which is selected, by the electronic control apparatus 140, in accordance with, for example, an accelerating operation made by a vehicle driver (operator) and a vehicle running speed V [km/h]. The step-variable transmission portion 46 is shifted up or down from one of the AT gear positions to another, for example, by so-called "clutch-to-clutch" shifting operation that is made by releasing and engaging actions of selected two of the engagement devices CB, namely, by a releasing action of one of the engagement devices CB and an engaging action of another one of the engagement devices CB.

Referring back to FIG. 2, the four-wheel drive vehicle 10 further includes an MOP 62 that is a mechanically-operated oil pump, and an electrically-operated oil pump (not shown).

The above-described one-way clutch F0 is a locking mechanism by which the carrier CA0 can be fixed to be unrotatable. That is, the one-way clutch F0 is the locking mechanism capable of fixing the connection shaft 48 (which is connected to the crank shaft of the engine 12 and is to be rotated integrally with the carrier CA0) relative to the casing 26. The one-way clutch F0 includes two members that are rotatable relative to each other, wherein one of the two members is connected integrally to the connection shaft 48, and the other member is connected integrally to the casing 26. The other member of the one-way clutch F0 is to be rotated in a positive direction (that corresponds to a direction of rotation of the engine 12 during operation of the engine 12), with the one-way clutch F0 being in its released state. However, the other member of the one-way clutch F0 is not rotatable in a negative direction (that is opposite to the above-describe positive direction), with the one-way clutch F0 being automatically placed in its engaged. Thus, the engine 12 is rotatable relative to the casing 26 when the one-way clutch F0 is in the released state, and is unrotatable relative to the casing 26 when the one-way clutch F0 is the engaged state. That is, the engine 12 is fixed to the casing 26 by the engagement of the one-way clutch F0. Thus, the one-way clutch F0 allows the carrier CA0 to be rotated in the above-described positive direction corresponding to the direction of rotation of the engine 12, and inhibits the carrier CA0 from being rotated in the above-described negative direction. That is, the one-way clutch F0 is the locking mechanism which allows rotation of the engine 12 in the positive direction and which inhibits rotation of the engine 12 in the negative direction.

The MOP 62 is connected to the connection shaft 48 so as to be rotated together with rotation the engine 12 and to discharge a working fluid OIL that is be used in the power transmission apparatus 18. Further, the electrically-operated oil pump (not shown) is operated, for example, when the engine 12 is stopped, namely, when the MOP 62 is not operated. The working fluid OIL discharged from the MOP 62 and the electrically-operated oil pump is supplied to the hydraulic control unit 60. The working fluid OIL is regulated by the hydraulic control unit 60, and the regulated hydraulic pressure is supplied to the hydraulic actuator of each of the engagement devices CB of the power transmission apparatus 18 (see FIG. 1).

Figure 4:
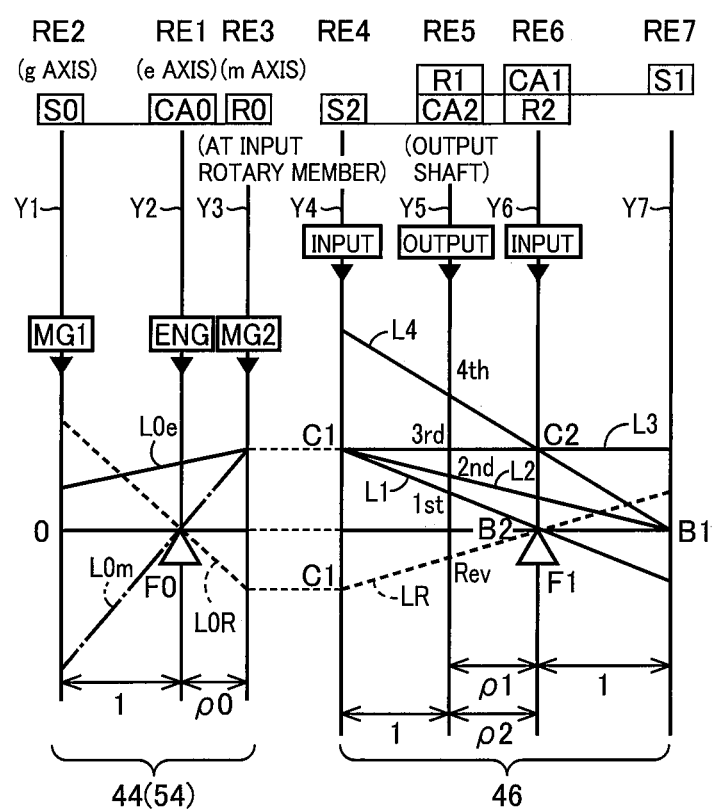
FIG. 4 is a collinear chart indicating a relationship among rotational speeds of rotary elements of an electrically-operated continuously-variable transmission portion (shown in FIG. 2) and the mechanically-operated step-variable transmission portion.

FIG. 4 is a collinear chart indicating a relationship among rotational speeds of the rotary elements of the continuously-variable transmission portion 44 and the step-variable transmission portion 46 that are shown in FIG. 2. In FIG. 4, three vertical lines Y1, Y2, Y3 corresponding to the three rotary elements of the differential mechanism 54 constituting the continuously-variable transmission portion 44 are a g-axis representing the rotational speed of the sun gear S0 corresponding to a second rotary element RE2, an e-axis representing the rotational speed of the carrier CA0 corresponding to a first rotary element RE1, and an m-axis representing the rotational speed of the ring gear R0 corresponding to a third rotary element RE3 (i.e., the input rotational speed of the step-variable transmission portion 46) in order from the left side to the right. Four vertical lines Y4, Y5, Y6, Y7 of the step-variable transmission portion 46 are axes representing a rotational speed of the sun gear S2 corresponding to a fourth rotary element RE4, a rotational speed of the ring gear R1 and the carrier CA2 connected to each other and corresponding to a fifth rotary element RE5 (i.e., the rotational speed of the output shaft 50), a rotational speed of the carrier CA1 and the ring gear R2 connected to each other and corresponding to a sixth rotary element RE6, and a rotational speed of the sun gear S1 corresponding to a seventh rotary element RE7, respectively, in order from the left side to the right. An interval between the vertical lines Y1, Y2, Y3 is determined in accordance with a gear ratio $\rho 0$ of the differential mechanism 54. An interval between the vertical lines Y4, Y5, Y6, Y7 is determined in accordance with gear ratios $\rho 1$, $\rho 2$ of the first and second planetary gear devices 56, 58. Where an interval between the sun gear and the carrier is set to an interval corresponding to "1" in the relationship between the vertical axes of the collinear chart, an interval between the carrier and the ring gear is set to an interval corresponding to the gear ratio $\rho$ (=number of teeth of the sun gear/number of teeth of the ring gear) of the planetary gear device.

As shown in the collinear chart of FIG. 4, in the differential mechanism 54 of the continuously-variable transmission portion 44, the engine 12 (see "ENG" in FIG. 4) is connected to the first rotary element RE1, the first rotating machine MG1 (see "MG1" in FIG. 4) is connected to the second rotary element RE2, and the second rotating machine MG2 (see "MG2" in FIG. 4) is connected to the third rotary element RE3 that is to be rotated integrally with the intermediate transmission member 52, such that rotation of the engine 12 is to be transmitted to the step-variable transmission portion 46 through the intermediate transmission member 52. The relationship between the rational speeds of the sun gear S0 and the ring gear R0 in the continuously-variable transmission portion 44 is represented by straight lines L0e, L0m, L0R that pass through the vertical line Y2.

In the step-variable transmission portion 46, the fourth rotary element RE4 is selectively connected to the intermediate transmission member 52 through the clutch C1, the fifth rotary element RE5 is connected to the output shaft 50, the sixth rotary element RE6 is selectively connected to the intermediate transmission member 52 through the clutch C2 and is selectively connected to the casing 26 through the brake B2, and the seventh rotary element RE7 is selectively connected to the casing 26 through the brake B1. In the step-variable transmission portion 46, the gear positions "1st", "2nd", "3rd", "4th", "Rev" are selectively established by engagement/release controls of the engagement devices CB, and the rotational speed of the output shaft 50 when each of the gear positions is established is indicated by an intersection of a corresponding one of straight lines L1, L2, L3, L4, LR with the vertical line Y5.

In FIG. 4, a straight line L0e and the straight lines L1, L2, L3, L4, which are represented by respective solid lines, indicate the relationship among the rotational speeds of the rotary elements in forward running of the four-wheel drive vehicle 10 in HV running mode in which the vehicle 10 is enabled to perform a hybrid running (=HV running) with at least the engine 12 being operated as the drive power source PU. In this hybrid running mode, when a reaction torque, i.e., a negative torque from the first rotating machine MG1, is inputted in positive rotation to the sun gear S0 with respect to the engine torque Te inputted to the carrier CA0 in the differential mechanism 54, an engine direct transmission torque Td [Nm] [$=Te/(1+\rho 0)=-(1/\rho 0)\times Tg$] appears in the ring gear R0 as a positive torque in positive rotation. A combined torque of the engine direct transmission torque Td and the MG2 torque Tm is transmitted as a drive torque of the vehicle 10 acting in the forward direction depending on a required drive force Frdem [N] to the transfer 30 through the step-variable transmission portion 46 in which one of the AT first to fourth gear positions is established. The first rotating machine MG1 functions as the generator when generating a negative torque with its rotation in positive direction. An electric power Wg [W] generated by the first rotating machine MG1 is stored in the battery 24 or consumed by the second rotating machine MG2. The second rotating machine MG2 outputs the MG2 torque Tm by using all or a part of the generated electric power Wg or using the electric power supplied from the battery 24 in addition to the generated electric power Wg.

In FIG. 4, a straight line L0m represented by one-dot chain line and the straight lines L1, L2, L3, L4 represented by the respective solid lines indicate the relationship among the rotational speeds of the rotary elements in forward running of the four-wheel drive vehicle 10 in EV running mode in which the vehicle 10 is enabled to perform a motor running (=EV running) with at least one of the first and second rotating machines MG1, MG2 as vehicle-drive rotating machines being operated as the drive power source PU in a state in which the engine 12 is stopped. As the EV running in forward direction in the EV running mode, there are a one-motor-drive EV running and a two-motor-drive EV running, for example. In the one-motor-drive EV running, the vehicle 10 is caused to run with only the second rotating machine MG2 being operated as the drive power source PU. In the two-motor-drive EV running, the vehicle 10 is caused to run with both of the first and second rotating machines MG1, MG2 being operated as the drive power sources PU. In the one-motor-drive EV running, the carrier CA0 is not rotated, and the MG2 torque Tm acting as a positive torque is inputted to the ring gear R0 whereby the ring gear R0 is rotated in positive direction. In this instance, the first rotating machine MG1, which is connected to the sun gear S0, is placed in non-load state and is idled in negative direction. In the one-motor-drive EV running, the one-way clutch F0 is released so that the connection shaft 48 is not fixed to the casing 26.

In the two-motor-drive EV running, in a state in which the carrier CA0 is not rotated, when the MG1 torque Tg acting as a negative torque is inputted to the sun gear S0 whereby the sun gear S0 is rotated in negative direction, the one-way clutch F0 is automatically engaged so as to inhibit the carrier CA0 from being rotated in negative direction. While the carrier CA0 is fixed to be unrotatable by engagement of the one-way clutch F0, the MG1 torque Tg acts as a reaction torque on the ring gear R0. Further, in the two-motor-drive EV running, the MG2 torque Tm is inputted to the ring gear R0 as in the one-motor-drive EV running. In the state in which the carrier CA0 is not rotated, if the MG2 torque Tm is not inputted to the ring gear R0 when the MG1 torque Tg acting as the negative torque is inputted to the sun gear S0, the one-motor-drive EV running is performed with the MG1 torque Tg. In the forward running in the EV running mode, the engine rotational speed Ne is zeroed with the engine 12 being not operated, and the torque of at least one of the MG1 torque Tg and the MG2 torque Tm is transmitted, as a drive torque for driving the four-wheel drive vehicle 10 to run in forward direction, to the transfer 30 through the step-variable transmission portion 46 in which one of the AT first to fourth gear positions is established. In the forward running in the EV running mode, the MG1 torque Tg acts as a negative torque in negative direction and serves as a power running torque, while the MG2 torque Tm acts as a positive torque in positive direction and serves as a power running torque.

In FIG. 4, the straight lines L0R, LR represented by respective broken lines indicate the relationship among the rotational speeds of the rotary elements in reverse running of the four-wheel drive vehicle 10 in the EV running mode. In this reverse running in the EV running mode, the MG2 torque Tm acting as the negative torque in the negative direction is inputted to the ring gear R0, and is transmitted, as a drive torque for driving the vehicle 10 to run in reverse direction, to the transfer 30 through the step-variable transmission portion 46 in which the AT first gear position is established. In the vehicle 10, under controls executed by the electronic control apparatus 140, in a state in which the AT first gear position or other low-speed gear position among the plurality of AT gear positions is established, the MG2 torque Tm acting in the negative direction that is opposite to when the vehicle 10 runs in the forward direction, is outputted from the second rotating machine MG2 whereby the reverse running of the vehicle 10 can be performed. In the reverse running in the EV running mode, the MG2 torque Tm acts as a negative torque in the negative direction and serves as a power running torque. It is noted that, in the HV running mode, too, since the second rotating machine MG2 can be rotated in the negative direction as indicated by the straight line L0R, the reverse running of the vehicle 10 can be performed as in the EV running mode.

Figure 5:
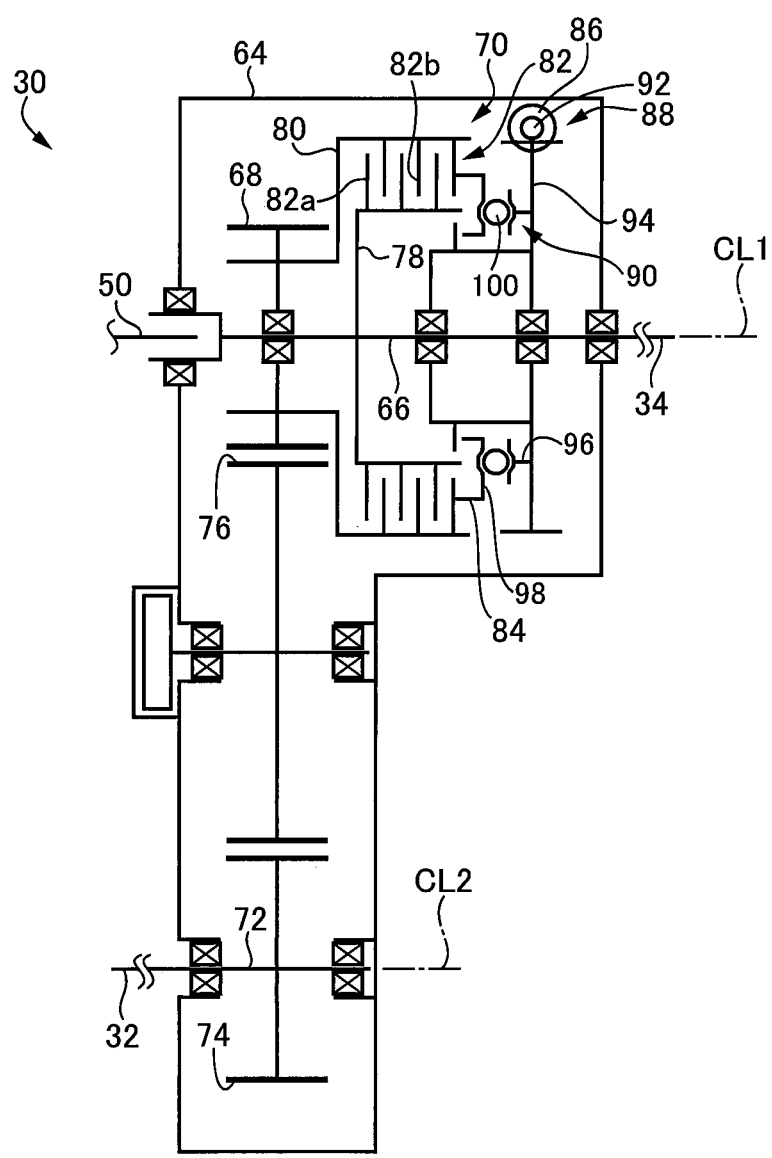
FIG. 5 is a view schematically showing a construction of a transfer shown in FIG. 1 and FIG. 2.
Figure 6:
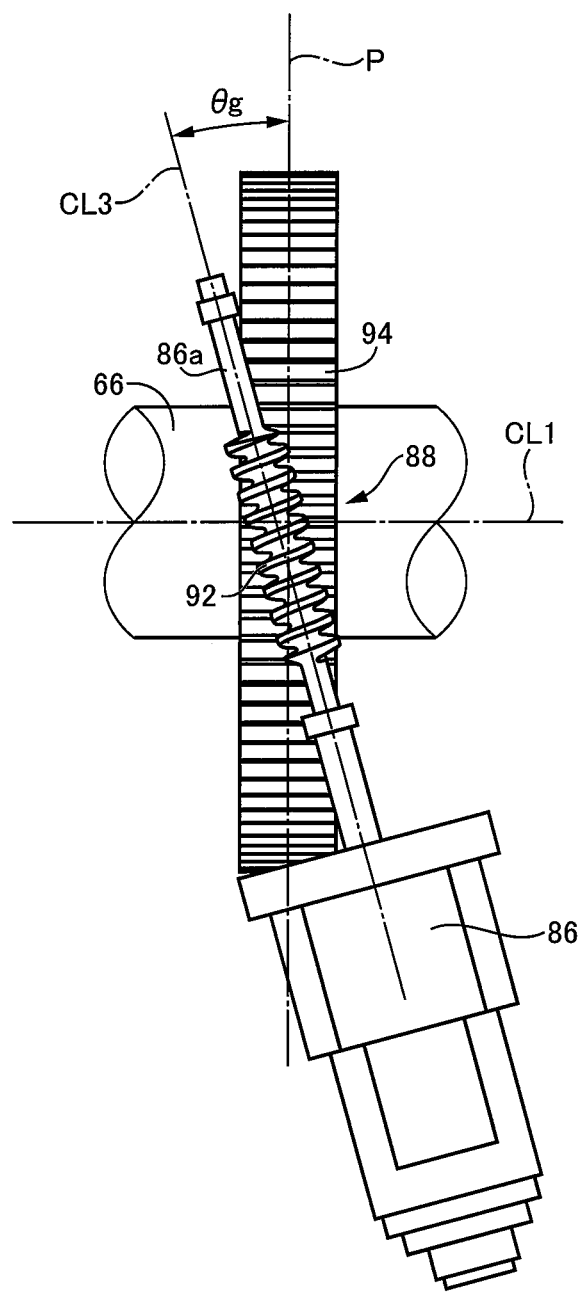
FIG. 6 is a view showing an electric motor and a worm gear that are provided in the transfer of FIG. 5.

FIG. 5 is a view schematically showing a construction of the transfer 30 shown in FIG. 1 and FIG. 2. FIG. 6 is a view showing the electric motor 86 and the worm gear 88 that are provided in the transfer of FIG. 5.

The transfer 30 includes a transfer casing 64 as a non-rotary member, a rear-wheel-side output shaft 66, a front-wheel driving gear 68 and a front-wheel drive clutch 70. The rear-wheel-side output shaft 66, front-wheel driving gear 68 and front-wheel drive clutch 70 are provided inside the transfer casing 64, and are disposed on the rotary axis CL1 that is common to the output shaft 66, driving gear 68 and drive clutch 70. The transfer 30 further includes a front-wheel-side output shaft 72, a front-wheel driven gear 74 and a front-wheel idler gear 76 that are provided inside the transfer casing 64, such that the front-wheel-side output shaft 72 and the front-wheel driven gear 74 are disposed on a rotary axis CL2 that is common to the output shaft 72 and driven gear 74.

The rear-wheel-side output shaft 66 is connected to the output shaft 50 in a power transmittable manner, and is connected to the rear propeller shaft 34 in a power transmittable manner, so that the drive power transmitted from the drive power source PU to the output shaft 50 through the automatic transmission 28 is to be outputted toward the rear wheels 16 by the rear-wheel-side output shaft 66. The output shaft 50 serves also as an input rotary member of the transfer 30, which is configured to input the drive power transmitted from the drive power source PU, to the rear-wheel-side output shaft 66 of the transfer 30, namely, serves as a drive-power transmission shaft configured to transmit the drive power transmitted from the drive power source PU, to the transfer 30.

The front-wheel driving gear 68 is provided to be rotatable relative to the rear-wheel-side output shaft 66. The front-wheel drive clutch 70 is a multi-plate friction clutch capable of changing a torque transmitted from the rear-wheel-side output shaft 66 to the front-wheel driving gear 68, namely, changing a torque transmitted from the rear-wheel-side output shaft 66 to the front-wheel-side output shaft 72.

The front-wheel driven gear 74 is provided to be integral with the front-wheel-side output shaft 72, so as to be connected to the front-wheel-side output shaft 72 in a power transmittable manner. The front-wheel idler gear 76 is provided to mesh with the front-wheel driving gear 68 and the front-wheel driven gear 74, so as to connect between the front-wheel driving gear 68 and the front-wheel driven gear 74 in a power transmittable manner.

The front-wheel-side output shaft 72 is connected to the front-wheel driving gear 68 through the front-wheel driven gear 74 and the front-wheel idler gear 76 to the front-wheel driving gear 68 in a power transmittable manner, and is connected also to the front propeller shaft 32 in a power transmittable manner. The front-wheel-side output shaft 72 is configured to output a part of the drive power from the drive power source PU, which part is transmitted to the front-wheel driving gear 68 through the front-wheel drive clutch 70, so that the outputted part of the drive power is to be transmitted toward the front wheels 14.

The front-wheel drive clutch 70 includes a clutch hub 78, a clutch drum 80, frictional engagement elements 82 and a piston 84. The front-wheel drive clutch 70 corresponds to "drive-power distribution clutch" recited in the appended claims. The clutch hub 78 is connected to the rear-wheel-side output shaft 66 in a power transmittable manner. The clutch drum 80 is connected to the front-wheel driving gear 68 in a power transmittable manner. The frictional engagement elements 82 include a plurality of first friction plates 82*a* and a plurality of second friction plates 82*b*. The first friction plates 82*a* are provided to be movable in the direction of the rotary axis CL1 relative to the clutch hub 78 and to be unrotatable relative to the clutch hub 78. The second friction plates 82*b* are provided to be movable in the direction of the rotary axis CL1 relative to the clutch drum 80 and to be unrotatable relative to the clutch drum 80. The first and second friction plates 82*a*, 82*b* are alternately arranged and supposed on each other in the direction of the rotary axis CL1. The piston 84 is provided to be movable in the direction of the rotary axis CL1, so as to be brought into contact with the frictional engagement elements 82 and press the first and second friction plates 82*a*, 82*b*, thereby adjusting a torque capacity of the front-wheel drive clutch 70. When the frictional engagement elements 82 are not pressed by the piston 84, the torque capacity of the front-wheel drive clutch 70 is zeroed whereby the front-wheel drive clutch 70 is released.

With the torque capacity of the front-wheel drive clutch 70 being adjusted, the front-wheel drive clutch 70 distributes the drive power from the drive power source PU transmitted through the automatic transmission 28, toward the rear-wheel-side output shaft 66 and the front-wheel-side output shaft 72. When the front-wheel drive clutch 70 is in its released state, namely, when a power transmission path between the rear-wheel-side output shaft 66 and the front-wheel driving gear 68 is cut off, the drive power from the drive power source PU transmitted to the transfer 30 through the automatic transmission 28 is transmitted toward the rear wheels 16 through, for example, the rear propeller shaft 34. When the front-wheel drive clutch 70 is in its slip-engaged state or fully engaged state, namely, when the power transmission path between the rear-wheel-side output shaft 66 and the front-wheel driving gear 68 is not cut off, a part of the drive power from the drive power source PU transmitted to the transfer 30 is transmitted toward the front wheels 14 through, for example, the front propeller shaft 32, and the remainder of the drive power from the drive power source PU transmitted to the transfer 30 is transmitted toward the rear wheels 16 through, for example, the rear propeller shaft 34. The transfer 30 is a drive-power distribution device capable of transmitting the drive power from the drive power source PU toward the front wheels 14 and the rear wheels 16, and corresponds to "drive-power distribution device" recited in the appended claims.

The transfer 30 includes the above-described electric motor 86, worm gear 88 and a cam mechanism 90 that cooperate with one another to constitute a device configured to operate the front-wheel drive clutch 70.

As shown in FIG. 6, the worm gear 88 is a pair of gears consisting of a worm 92 integrally formed on a motor shaft 86*a* of the electric motor 86 and a worm wheel 94 provided with teeth that mesh with the worm 92. It is noted that the electric motor 86, the motor shaft 86*a* and the worm gear 88 correspond to "worm-drive electric motor", "shaft" and "gear mechanism", respectively, which are recited in the appended claims. The worm wheel 94 is provided to be rotatable about the rotary axis CL1, so as to be rotated about the rotary axis CL1 when the electric motor 86 is rotated. The worm wheel 94 is a spur gear in which the teeth provided in its outer periphery are parallel to the rotary axis CL1. Further, as shown in FIG. 6, the electric motor 86 is positioned relative to the worm 92 such that a rotary axis CL3 of the motor shaft 86*a* is inclined relative to a rotation surface P orthogonal to the rotary axis CL1 about which the worm wheel 94 is to be rotated, by a pitch angle θg [rad] of the worm 92.

As shown in FIG. 5, the cam mechanism 90 is provided between the worm wheel 94 and the piston 84 of the front-wheel drive clutch 70. The cam mechanism 90 includes a first member 96 connected to the worm wheel 94, a second member 98 connected to the piston 84, and a plurality of balls 100 interposed between the first and second members 96, 98, and is a mechanism configured to convert a rotary motion of the electric motor 86 into a linear motion.

The plurality of balls 100 are arranged equi-angularly in a circumferential direction about the rotary axis CL1. Each of first and second members 96, 98 has a cam groove provided in its contact surface that is in contact with the balls 100. The cam groove provided in the contact surface of each of the first and second members 96, 98 has a shape by which the first and second members 96, 98 are moved away from each other in the direction of the rotary axis CL1 when the first and second members 96, 98 are rotated relative to each other. Therefore, when the first and second members 96, 98 are rotated relative to each other, the first and second members 96, 98 are moved away from each other in the direction of the rotary axis CL1 whereby the piston 84 connected to the second member 98 is caused to press the frictional engagement elements 82. When the worm wheel 94 is rotated by the electric motor 86, a rotary motion of the worm wheel 94 is converted by the cam mechanism 90 into a liner motion in the direction of the rotary axis CL1, which is transmitted to the piston 84, and the frictional engagement elements 82 are pressed by the piston 84. Thus, the cam mechanism 90 is configured to cause a pressing force F [N] to be generated in the front-wheel drive clutch 70, by converting the rotary motion of the worm wheel 94 into the linear motion in the direction of the rotary axis CL1 of the front-wheel drive clutch. It is noted that the rotary axis CL1 and the cam mechanism 90 correspond to "axis" and "conversion mechanism", respectively, which are recited in the appended claims.

The pressing force F by which the piston 84 presses the frictional engagement elements 82 is changed whereby the torque capacity of the front-wheel drive clutch 70 is changed. With the torque capacity of the front-wheel drive clutch 70 being changed, the transfer 30 can change a drive-power distribution ratio Rx that is a ratio of distribution of the drive power from the drive power source PU, between the pair of front wheels 14 and the pair of rear wheels 16.

The drive-power distribution ratio Rx is, for example, a rear-wheel-side drive-power distribution ratio Xr that is a ratio of the drive power transmitted from the drive power source PU to the rear wheels 16, to all of the drive power transmitted from the drive power source PU to the rear and front wheels 16, 14. Alternatively, the drive-power distribution ratio Rx is, for example, a front-wheel-side drive-power distribution ratio Xf (=1−Xr) that is a ratio of the drive power transmitted from the drive power source PU to the front wheels 14, to all of the drive power transmitted from the drive power source PU to the rear and front wheels 16, 14. In the present embodiment in which the rear wheels 16 are the main drive wheels, the rear-wheel-side drive-power distribution ratio Xr, which is a ratio of the drive power transmitted to the main drive wheels, is used as the drive-power distribution ratio Rx.

When the piston 84 does not press the frictional engagement elements 82, the torque capacity of the front-wheel drive clutch 70 is zeroed. In this instance, the front-wheel drive clutch 70 is released whereby the rear-wheel-side drive-power distribution ratio Xr becomes 1.0. In other words, the drive-power distribution ratio Rx, which is the ratio of distribution of the drive power between the pair of front wheels 14 and the pair of rear wheels 16, i.e., (drive power transmitted to front wheels 14):(drive power transmitted to rear wheels 16), is 0:100 where 100 represents all of the drive power from the drive power source PU transmitted to the transfer 30. On the other hand, when the piston 84 presses the frictional engagement elements 82, the torque capacity of the front-wheel drive clutch 70 is made larger than 0, and the rear-wheel-side drive-power distribution ratio Xr is reduced with increase of the torque capacity of the front-wheel drive clutch 70. When the torque capacity of the front-wheel drive clutch 70 is maximized, namely, when the front-wheel drive clutch 70 is fully engaged, the rear-wheel-side drive-power distribution ratio Xr becomes 0.5, namely, the drive-power distribution ratio Rx becomes 50:50 that is an equilibrium state. Thus, the transfer 30 is capable of adjusting the rear-wheel-side drive-power distribution ratio Xr within a range from 1.0 to 0.5, namely, adjusting the drive-power distribution ratio Rx within a range from 0:100 to 50:50, by adjusting the torque capacity of the front-wheel drive clutch 70. That is, the transfer 30 is capable of selectively establishing its two-wheel drive state and four-wheel drive state, such that the drive power from the drive power source PU is transmitted only toward the rear wheels 16 when the two-wheel drive state is established, and such that the drive power from the drive power source PU is transmitted toward the rear and front wheels 16, 14 when the four-wheel drive state is established.

Figure 7:
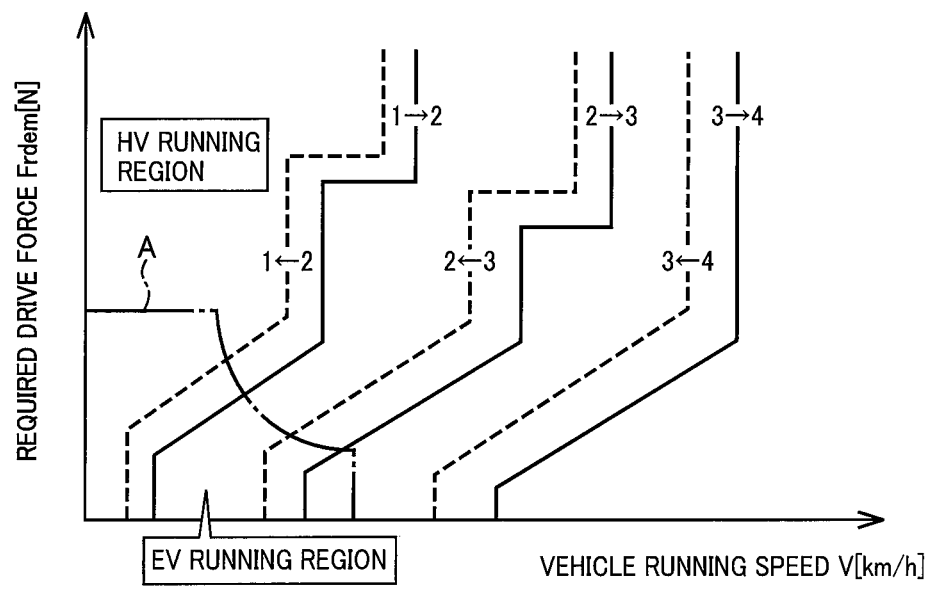
FIG. 7 is a view showing, by way of examples, an AT-gear-position shifting map used for controlling gear shifting in the mechanically-operated step-variable transmission portion, a running-mode switching map used for switching a running mode, and a relationship between the AT-gear-position shifting map and the running-mode switching map.

FIG. 7 is a view showing, by way of examples, an AT-gear-position shifting map used for controlling gear shifting in the step-variable transmission portion 46, a running-mode switching map used for switching a running mode, and a relationship between the AT-gear-position shifting map and the running-mode switching map, which are pre-obtained by experimentation or predetermined by an appropriate design theory and are stored in the electronic control apparatus 140, for example. The AT-gear-position shifting map defines shift-up lines (solid lines) and shift-down lines (broken lines), with two variables in the form of the vehicle running speed V [km/h] and the required drive force Frdem [N]. When a point defined by a combination of actual values of the two variables, i.e., the running speed V and the required drive force Frdem is moved across one of the shift-up lines (solid lines) or the shift-down lines (broken lines), it is determined that the shift control operation is to be started. In general, the EV running is executed in a low running speed range or a low load range that are defined by one-dot chain line A in FIG. 7, wherein the low running speed range is a range in which the running speed V is relatively low and an engine efficiency is low, and the low load range is a range in which the required drive force Frdem is relative small.

Further, the EV running is executed when a charged state value SOC [%] of the battery 24 connected to the second rotating machine MG2 through the inverter 22 is not lower than a predetermined value, wherein the charged state value SOC is a value indicative of an amount of the electric power stored in the battery 24. With a suitable one of the AT gear positions being established in the step-variable transmission portion 46 in accordance with the AT-gear-position shifting map, it is possible to obtain an advantageous energy efficiency (e.g., fuel economy) in the four-wheel drive vehicle 10. It is noted that the running speed V as one of the two variables in the AT-gear-position shifting map may be replaced by the output rotational speed No, for example, and that the required drive force Frdem as another one of the two variables in the AT-gear-position shifting map may be replaced by a required drive torque Trdem [Nm], an accelerator opening degree θacc [%] or a throttle opening degree θth [%], for example.

Referring back to FIG. 1, the four-wheel drive vehicle 10 is provided with the electronic control apparatus 140 as a controller that includes a control apparatus configured to control, for example, the drive power sources PU and the transfer 30. FIG. 1 is a view showing an input/output system of the electronic control apparatus 140, and is a functional block diagram for explaining major control functions and control portions of the electronic control apparatus 140. For example, the electronic control apparatus 140 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 140 may be constituted by two or more control units exclusively assigned to perform different control operations such as an engine control operation and a shift control operation. It is noted that the electronic control apparatus 140 corresponds to "control apparatus" recited in the appended claims.

The electronic control apparatus 140 receives various input signals based on values detected by respective sensors provided in the four-wheel drive vehicle 10. Specifically, the electronic control apparatus 140 receives: an output signal of an engine speed sensor 110 indicative of the engine rotational speed Ne which is the rotational speed of the engine 12; an output signal of an output speed sensor 112 indicative of the output rotational speed No which corresponds to the running speed V of the vehicle 10; an output signal of a MG1 speed sensor 114 indicative of an MG1 rotational speed Ng [rpm] which is a rotational speed of the first rotating machine MG1; an output signal of a MG2 speed sensor 116 indicative of the MG2 rotational speed Nm which is a rotational speed of the second rotating machine MG2 and which is equal to the AT input rotational speed Ni; an output signal of a wheel speed sensor 118 indicative of a wheel rotational speed Nr [rpm] of each of the wheels 14, 16; an output signal of an accelerator-opening degree sensor 120 indicative of the accelerator opening degree θacc representing an amount of accelerating operation made by the vehicle driver; an output signal of a throttle-opening degree sensor 122 indicative of the throttle opening degree θth that is an opening degree of an electronic throttle valve; an output signal of a G sensor 124 indicative of a longitudinal acceleration Gx [m/sec$^2$] and a lateral acceleration Gy [m/sec$^2$] of the vehicle 10; an output signal of a shift position sensor 126 indicative of an operation position POSsh of a shift lever provided in the vehicle 10; an output signal of a yaw rate sensor 128 indicative of a yaw rate Vyaw [rad/sec] that is a rate of change of a vehicle rotation angle about a vertical axis passing through a center of gravity of the vehicle 10; an output signal of a steering sensor 130 indicative of a steering angle θsw [rad] and a steering direction Dsw of a steering wheel provided in the vehicle 10; an output signal of a battery sensor 132 indicative of a battery temperature THbat [° C.], a battery charging/discharging electric current Ibat [A] and a battery voltage Vbat [V] of the battery 24; and an output signal of a fluid temperature sensor 134 indicative of a working fluid temperature THoil [° C.] that is a temperature of the working fluid OIL.

The electronic control apparatus 140 generates various command signals to the various devices provided in the four-wheel drive vehicle 10, such as: an engine control command signal Se that is to be supplied to the engine control device 20 for controlling the engine 12; a rotating-machine control command signal Smg that is to be supplied to the inverter 22 for controlling the first and second rotating machines MG1, MG2; a hydraulic-pressure control command signal Sat that is to be supplied to the hydraulic control unit 60 for controlling the operation states of the engagement devices CB; and an electric-motor control command signal Sw that is to be supplied to the electric motor 86 for controlling the electric motor 86.

The electronic control apparatus 140 functionally includes a hybrid control portion 142, an AT-shift control portion 144, a four-wheel-drive control portion 146 and a map storage portion 148.

The AT-shift control portion 144 is configured to determine whether a shifting action of the step-variable transmission portion 46 is to be executed, by using, for example, the AT gear position shift map as shown in FIG. 7, and to output the hydraulic-pressure control command signal Sat supplied to the hydraulic control unit 60, so as to execute the shift control operation in the step-variable transmission portion 46 as needed.

The hybrid control portion 142 functionally includes an engine control portion 142a and a rotating-machine control portion 142b, and executes a hybrid drive control, for example, using the engine 12, the first rotating machine MG1 and the second rotating machine MG2 through these control functions. The engine control portion 142a serves as an engine control means for controlling the operation state (operated state, non-operated state) of the engine 12. The rotating-machine control portion 142b serves as a rotating-machine control means for controlling the operation state of each of the first and second rotating machines MG1, MG2 via the inverter 22.

The hybrid control portion 142 calculates a required driving amount in the form of the required drive force Frdem, for example, by using a required driving amount map that represents a predetermined relationship between the required drive force Frdem and each of the accelerator opening degree θacc and the vehicle running speed V. The required drive force Frdem is also a target drive force from another point of view. The required drive torque Trdem [Nm] applied to the drive wheels (front and rear wheels 14, 16), a required drive power Prdem [W] applied to the drive wheels, a required AT output torque applied to the output shaft 50, etc. can be used as the required driving amount, in addition to the required drive force Frdem.

The hybrid control portion 142 controls the operation state of each of the first and second rotating machines MG1, MG2 such that the drive force acting on the four-wheel drive vehicle 10 becomes the target drive force.

For example, the hybrid control portion 142 outputs the engine control command signal Se for controlling the engine 12 by taking account of a maximum chargeable amount Win [W] of electric power that can be charged to the battery 24, and a maximum dischargeable amount Wout [W] of electric power that can be discharged from the battery 24, such that the required drive power Prdem based on the required drive torque Trdem and the vehicle running speed V is obtained. The engine control command signal Se is, for example, a command value of an engine power Pe [W] that is the power of the engine 12 outputting the engine torque Te at the current engine rotational speed Ne.

The maximum chargeable amount Win of the battery 24 is a maximum amount of the electric power that can be charged to the battery 24, and indicates an input limit of the battery 24. The maximum dischargeable amount Wout of the battery 24 is a maximum amount of the electric power that can be discharged from the battery 24, and indicates an output limit of the battery 24. The maximum chargeable and dischargeable amounts Win, Wout are calculated by the electronic control apparatus 140, for example, based on the battery temperature THbat and the charged state value SOC [%] of the battery 24. The charged state value SOC of the battery 24 is a value indicative of a charged state of the battery 24, i.e., an amount of the electric power stored in the battery 24, and is calculated by the electronic control apparatus 140, for example, based on the charging/discharging electric current Ibat and the voltage Vbat of the battery 24.

The rotating-machine control portion 142b outputs the rotating-machine control command signal Smg for controlling the operation states of the first and second rotating machines MG1, MG2 through the inverter 22. The rotating-machine control command signal Smg is, for example, a command value of the generated electric power Wg of the first rotating machine MG1 outputting the MG1 torque Tg as the reaction torque of the engine torque Te at the MG1 rotational speed Ng which is the MG1 rotational speed Ng at the time of the command signal Smg output, and is a command value of a consumed electric power Wm [W] of the second rotating machine MG2 outputting the MG2 torque Tm at the MG2 rotational speed Nm which is the MG2 rotational speed Nm at the time of the command signal Smg output.

For example, when the automatic transmission 28 is operated as a continuously variable transmission as a whole by operating the continuously-variable transmission portion 44 as a continuously variable transmission, the hybrid control portion 142 controls the engine 12 and controls the generated electric power Wg of the first rotating machine MG1 so as to attain the engine rotational speed Ne and the engine torque Te at which the engine power Pe achieving the required drive power Prdem is acquired in consideration of an engine optimum fuel consumption point etc., and thereby provides the continuously variable shift control of the continuously-variable transmission portion 44 to change the gear ratio γ0 of the continuously-variable transmission portion 44. As a result of this control, the gear ratio γt (=γ0× γat=Ne/No) of the automatic transmission 28 is controlled in the case of operating the automatic transmission 28 as a continuously variable transmission. The above-described engine optimum fuel consumption point is predetermined as an optimum engine operation point, i.e., an engine operation point that maximizes a total fuel efficiency in the four-wheel drive vehicle 10 including not only a fuel efficiency of the engine 12 but also a charge/discharge efficiency of the battery 24, for example, when a required engine power Pedem [W] is to be acquired. The engine operation point is an operation point of the engine 12 which is defined by a combination of the engine rotational speed Ne and the engine torque Te. The engine rotational speed Ne at the optimum engine operation point is an optimum engine rotational speed Neb [rpm] that maximizes the energy efficiency in the vehicle 10.

For example, when the automatic transmission 28 is operated as a step-variable transmission as a whole by operating the continuously-variable transmission portion 44 as in a step-variable transmission, the hybrid control portion 142 uses a predetermined relationship, for example, a step-variable gear position shift map, to determine need of a shifting action of the automatic transmission 28 and provides the shift control of the continuously-variable transmission portion 44 so as to selectively establish the plurality of gear positions in coordination with the shift control of the AT gear position of the step-variable transmission portion 46 by the AT-shift control portion 144. The plurality of gear positions can be established by controlling the engine rotational speed Ne by the first rotating machine MG1 depending on the output rotational speed No so as to maintain the respective gear ratios γt.

The hybrid control portion 142 selectively establishes the motor running mode or the hybrid running mode as the running mode depending on a running state, so as to cause the vehicle 10 to run in a selected one of the running modes. For example, the hybrid control portion 142 establishes the EV running mode when the required drive power Prdem is in an EV running region smaller than a predetermined threshold value, and establishes the HV running mode when the required drive power Prdem is in an HV running region equal to or greater than the predetermined threshold value.

In the EV running mode, when the required drive power Prdem can be obtained only by the second rotating machine MG2, the hybrid control portion 142 causes the four-wheel drive vehicle 10 to run in the one-motor-drive EV running with only the second rotating machine MG2 being operated as the drive power source PU. On the other hand, when the required drive power Prdem cannot be obtained only by the second rotating machine MG2 in the EV running mode, the hybrid control portion 142 causes the vehicle 10 to run in the two-motor-drive EV running. However, even when the required drive power Prdem can be obtained only by the second rotating machine MG2, the vehicle 10 may be caused to run in the two-motor-drive EV running, if the use of both of the first rotating machine MG1 and second rotating machine MG2 provides better energy efficiency than the use of only the second rotating machine MG2.

Even when the required drive power Prdem is in the EV running region, the hybrid control portion 142 establishes the HV running mode, for example, in a case in which the charged state value SOC of the battery 24 becomes less than a predetermined engine-start threshold value or in a case in which the engine 12 needs to be warmed up. The engine-start threshold value is a predetermined threshold value for determining that the charged state value SOC reaches a level at which the battery 24 needs to be charged by automatically starting the engine 12.

The four-wheel-drive control portion 146 executes a drive-power distribution control operation for changing the rear-wheel-side drive-power distribution ratio Xr.

The four-wheel-drive control portion 146 functionally includes a distribution-ratio-change determination portion 146a, an engine-state determination portion 146b, a transmission-state determination portion 146c, a rotating-machine-state determination portion 146d and an electric-motor control portion 146e.

In execution of the drive-power distribution control operation, the distribution-ratio-change determination portion 146a determines whether the rear-wheel-side drive-power distribution ratio Xr is to be changed or not, namely, whether the drive-power distribution ratio Rx, which is the ratio of distribution of the drive power between the front wheels 14 as the auxiliary drive wheels and the rear wheels 16 as the main drive wheels, is to be changed or not. The distribution-ratio-change determination portion 146a determines whether a target distribution ratio value Xrtgt of the rear-wheel-side drive-power distribution ratio Xr is to be changed or not, depending on the running state of the four-wheel drive vehicle 10, which is determined through, for example, the output speed sensor 112 and the G sensor 124. It is noted that the rear-wheel-side drive-power distribution ratio Xr and the target distribution ratio value Xrtgt correspond to "drive-power distribution ratio" and "target distribution ratio value", respectively, which are recited in the appended claims. When the vehicle 10 is running straight, for example, the distribution-ratio-change determination portion 146a releases the front-wheel drive clutch 70 so as to cause the rear-wheel-side drive-power distribution ratio Xr to become 1.0 (namely, cause the drive-power distribution ratio Rx to become 0:100). When the vehicle 10 is turning, the distribution-ratio-change determination portion 146a calculates a target rate value Vyawtgt of the yaw rate Vyaw [rad/sec], based on, for example, the steering angle θsw and the vehicle running speed V during turning of the vehicle 10, and changes the rear-wheel-side drive-power distribution ratio Xr such that the yaw rate Ryaw, which is constantly detected by the yaw rate sensor 128, follows the target rate value Vyawtgt of the yaw rate Vyaw.

The change of the rear-wheel-side drive-power distribution ratio Xr is made by controlling a motor electric current Im [A] supplied to the electric motor 86, namely, by determining or setting an electric-current command value Iminst of the electric current Im. With the electric-current command value Iminst of the motor electric current Im being set, the electric motor 86 is driven and rotated depending on an amount of the electric-current command value Iminst, whereby a motor rotation angle θm [rad] that is a rotation angle of the electric motor 86 is controlled, for example. With the motor rotation angle θm being changed, the piston 84 of the front-wheel drive clutch 70 is moved in the direction of the rotary axis CL1 through the worm gear 88 and the cam mechanism 90. With the piston 84 being moved, the pressing force F applied to the frictional engagement elements 82 is changed whereby the torque capacity of the front-wheel drive clutch 70 is changed.

By the way, a degree of easiness of rotation of the worm wheel 94 varies depending on a vibrational state of the transfer 30. Specifically, the worm wheel 94 is rotated more easily in a state in which the transfer 30 is vibrated, than in a state in which the transfer 30 is not vibrated. Thus, even where the motor electric current Im is not changed, the rotation angle of the worm wheel 94, i.e., the motor rotation angle θm corresponding to the rotation angle of the worm wheel 94, is likely to vary depending on the vibrational state of the transfer 30. The vibration of the transfer 30 is larger in a drive-power transmitted state in which the drive power from the engine 12 is being transmitted to the transfer 30, than in a drive-power non-transmitted state in which the drive power from the engine 12 is not being transmitted to the transfer 30. Therefore, even where the motor electric current Im is not changed, the worm wheel 94 is rotated more easily in the drive-power transmitted state than in the drive-power non-transmitted state, so that there is a case in which the motor rotation angle θm could be made too large so as to be deviated from its target angle value. If the motor rotation angle θm is deviated from the target angle value, an actual ratio value of the rear-wheel-side drive-power distribution ratio Xr is deviated from the target distribution ratio value Xrtgt whereby a control accuracy of the rear-wheel-side drive-power distribution ratio Xr is reduced. Hereinafter, a state in which the drive power containing a pulsating component corresponding to an explosion cycle of the engine 12 is being transmitted to the transfer 30 from the engine 12, will be referred to as "engine-pulsation transmitted state", while a state in which the pulsating component of the drive power is not being transmitted to the transfer 30 from the engine 12, will be referred to as "engine-pulsation non-transmitted state".

The map storage portion 148 stores therein electric-current command-value control maps that are to be used for determining or setting the electric-current command value Iminst of the motor electric current Im supplied to the electric motor 86 in a case in which the rear-wheel-side drive-power distribution ratio Xr is controlled to the target distribution ratio value Xrtgt.

Hereinafter, a target angle value of the motor rotation angle θm, which corresponds to the target distribution ratio value Xrtgt of the rear-wheel-side drive-power distribution ratio Xr, will be referred to as "target motor rotation angle value θmtgt". Each of the electric-current command-value control maps defines a relationship between the target motor rotation angle value θmtgt and the electric-current command value Iminst of the motor electric current Im, wherein the relationship is pre-obtained by experimentation or predetermined by an appropriate design theory. The electric-current command-value control maps include an electric-current command-value control map MAPi_0 and an electric-current command-value control map MAPi_1 that will be described below.

Figure 8:
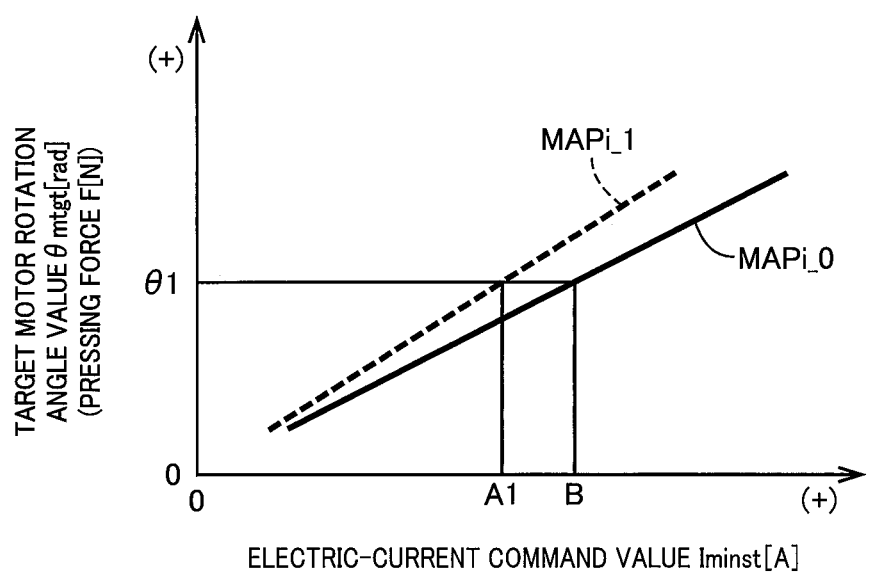
FIG. 8 is a view showing, by way of examples, an electric-current-command-value control map used for a state in which a drive power from an engine is not being transmitted to the transfer and another electric-current-command-value control map used for a state in which the drive power from the engine is being transmitted to the transfer.

FIG. 8 is a view showing, by way of examples, the electric-current-command-value control map MAPi_0 used for the engine-pulsation non-transmitted state and the electric-current command-value control map MAPi_1 used for the engine-pulsation transmitted state. As described above, with the pressing force F, by which the piston 84 presses the frictional engagement elements 82, being changed depending on the motor rotation angle θm, the torque capacity of the front-wheel drive clutch 70 is changed whereby the rear-wheel-side drive-power distribution ratio Xr is changed. Thus, it can be considered that each of the electric-current command-value control maps MAPi_0, MAPi_1 defines a relationship between the target distribution ratio value Xrtgt and the electric-current command value Iminst as well as the relationship between the target motor rotation angle value θmtgt and the electric-current command value Iminst. It is noted that the electric-current command-value control maps MAPi_0, MAPi_1 correspond to "control maps" recited in the appended claims.

In each of the electric-current command-value control maps MAPi_0, MAPi_1, the target motor rotation angle value θmtgt is increased with increase of the electric-current command value Iminst, namely, the target distribution ratio value Xrtgt of the rear-wheel-side drive-power distribution ratio Xr is changed from 100% toward 50% as the electric-current command value Iminst is increased.

In each of the electric-current command-value control maps MAPi_0, MAPi_1, the electric-current command value Iminst is predetermined such that an actual value of the motor rotation angle θm is not deviated from the target motor rotation angle value θmtgt depending on the vibrational state of the transfer 30. That is, as compared with in the electric-current command-value control map MAPi_0 used for the state in which the worm wheel 94 is not easily rotated, in the electric-current command-value control map MAPi_1 used for the state in which the worm wheel 94 is easily rotated, the electric-current command value Iminst is made smaller at the target motor rotation angle value θmtgt corresponding to the same target distribution ratio value Xrtg.

For example, when the target motor rotation angle value θmtgt is an angle value θ1, the electric-current command value Iminst of the motor electric current Im is determined or set as follows. In case of the engine-pulsation non-transmitted state, the electric-current command-value control map MAPi_0 is used, and the electric-current command value Iminst is set to a command value B. On the other hand, in case of the engine-pulsation transmitted state, the electric-current command-value control map MAPi_1 is used, and the electric-current command value Iminst is set to a command value A1. Thus, one of the electric-current command-value control maps MAPi_0, MAPi_1, which are different from each other, is selected depending on which one of the engine-pulsation non-transmitted state and the engine-pulsation transmitted state is established, and the selected one of the electric-current command-value control maps MAPi_0, MAPi_1 is used to set the electric-current command value Iminst to a suitable command value, thereby making it possible to suppress deviation of the actual value of the motor rotation angle θm from the angle value θ1 as the target motor rotation angle value θmtgt, and accordingly suppress deviation of an actual value of the rear-wheel-side drive-power distribution ratio Xr from the target distribution ratio value Xrtgt. It is noted that the command value B and the command value A1 correspond to "first command value" and "second command value", respectively, which are recited in the appended claims.

The engine-state determination portion 146b, transmission-state determination portion 146c and rotating-machine-state determination portion 146d cooperate with one another to determine whether the drive power (particularly, the pulsating component of the drive power) of the engine 12 is being transmitted to the transfer 30 or not, when the rear-wheel-side drive-power distribution ratio Xr is to be changed.

The engine-state determination portion 146b determines whether the engine 12 is in the operated state or not. The engine-state determination portion 146b determines that the engine 12 is in the operated state, for example, when the engine 12 is being driven and rotated in accordance with the engine control command signal Se. On the other hand, the engine-state determination portion 146b determines that the engine 12 is not in the operated state but in the non-operated state, for example, when the engine 12 is being neither driven nor rotated in accordance with the engine control command signal Se. As long as the engine 12 is being driven and rotated, the engine-state determination portion 146b determines that the engine 12 is in the operated state also during a transition from the non-operated state to the operated state and during a transition from the operated state to the non-operated state.

The transmission-state determination portion 146c determines whether the automatic transmission 28 is in a state in which the drive power from the engine 12 is transmittable to the transfer 30, or not. When each of the continuously-variable transmission portion 44 and the step-variable transmission portion 46 is in a state in which the drive power is transmittable therethrough, the transmission-state determination portion 146c determines that the automatic transmission 28 is in the state in which the drive power from the engine 12 is transmittable to the transfer 30. When at least one of the continuously-variable transmission portion 44 and the step-variable transmission portion 46 is not in the state in which the drive power is transmittable therethrough, the transmission-state determination portion 146c determines that the automatic transmission 28 is not in the state in which the drive power from the engine 12 is transmittable to the transfer 30. The transmission-state determination portion 146c determines that the continuously-variable transmission portion 44 is in the state in which the drive power from the engine 12 is transmittable therethrough toward the transfer 30, for example, when the reaction torque from the first rotating machine MG1 is being inputted to the sun gear S0 in the continuously-variable transmission portion 44. On the other hand, the transmission-state determination portion 146c determines that the continuously-variable transmission portion 44 is not in the state in which the drive power from the engine 12 is transmittable therethrough toward the transfer 30, when the reaction torque from the first rotating machine MG1 is not being inputted to the sun gear S0 in the continuously-variable transmission portion 44. The transmission-state determination portion 146c determines that the step-variable transmission portion 46 is in the state in which the drive power from the engine 12 is transmittable therethrough to the transfer 30, for example, when any one of the AT gear positions shown in FIG. 3 is being established in the step-variable transmission portion 46. On the other hand, the transmission-state determination portion 146c determines that the step-variable transmission portion 46 is not in the state in which the drive power from the engine 12 is transmittable therethrough to the transfer 30, for example, when the step-variable transmission portion 46 is in its neutral state without any one of the AT gear positions shown in FIG. 3 being established in the step-variable transmission portion 46.

The rotating-machine-state determination portion 146d determines whether the first rotating machine MG1 is in the vibration-suppression control state or not. When the first rotating machine MG1 is in the vibration-suppression control state, the rotating-machine control portion 142b controls the first rotating machine MG1 such that the MG1 torque Tg serving as the reaction torque is outputted from the first rotating machine MG1 for suppressing or cancelling the pulsating component of the drive power from the engine 12. When the first rotating machine MG1 is in the vibration-suppression control state, the vibration transmitted from the engine 12 to the transfer 30 is made smaller and the vibration of the transfer 30 is made smaller, than when the first rotating machine MG1 is not in the vibration-suppression control state.

When it is determined by the engine-state determination portion 146b, transmission-state determination portion 146c and rotating-machine-state determination portion 146d that the engine 12 is in the operated state, the automatic transmission 28 is in the state in which the drive power from the engine 12 is transmittable to the transfer 30, and the first rotating machine MG1 is not in the vibration-suppression control state, the four-wheel-drive control portion 146 determines that the engine-pulsation transmitted state is established. On the other hand, when it is determined by the engine-state determination portion 146b, transmission-state determination portion 146c and rotating-machine-state determination portion 146d that the engine 12 is not in the operated state, the automatic transmission 28 is not in the state in which the drive power from the engine 12 is transmittable to the transfer 30, and/or the first rotating machine MG1 is in the vibration-suppression control state, the four-wheel-drive control portion 146 determines that the engine-pulsation non-transmitted state is established.

When it is determined by the distribution-ratio-change determination portion 146a that the rear-wheel-side drive-power distribution ratio Xr is to be changed, the electric-motor control portion 146e determines or sets the electric-current command value Iminst of the motor electric current Im, by using one of the electric-current command-value control maps MAPi_0, MAPi_1 shown in FIG. 8. In a case in which it is determined by cooperation of the engine-state determination portion 146b, transmission-state determination portion 146c and rotating-machine-state determination portion 146d that the engine-pulsation non-transmitted state is being established, the electric-motor control portion 146e sets the electric-current command value Iminst of the motor electric current Im to a suitable command value, by using the electric-current command-value control map MAPi_0. On the other hand, in a case in which it is determined by cooperation of the engine-state determination portion 146b, transmission-state determination portion 146c and rotating-machine-state determination portion 146d that the engine-pulsation transmitted state is being established, the electric-motor control portion 146e sets the electric-current command value Iminst of the motor electric current Im to a suitable command value, by using the electric-current command-value control map MAPi_1.

The electric-motor control portion 146e outputs the electric-motor control command signal Sw for controlling the electric motor 86 such that the torque capacity of the front-wheel drive clutch 70 is changed by the set electric-current command value Iminst of the motor electric current Im whereby the rear-wheel-side drive-power distribution ratio Xr becomes the target distribution ratio value Xrtgt. Thus, the electric-motor control portion 146e controls the motor rotation angle θm such that the rear-wheel-side drive-power distribution ratio Xr becomes the target distribution ratio value Xrtgt. For example, in a case in which the target motor rotation angle value θmtgt is the angle value θ1, the electric-current command value Iminst is set to the command value B when it is determined that the engine-pulsation non-transmitted state is established, and is set to the command value A1 (<B) when it is determined that the engine-pulsation transmitted state is established, as shown in FIG. 8.

Thus, the electric-motor control portion 146e determines or sets the electric-current command value Iminst of the motor electric current Im (which is to be supplied to the electric motor 86), depending on whether the drive power from the engine 12 is being transmitted to the transfer 30 or not, such that the electric-current command value Iminst is set to a smaller value when the engine-pulsation transmitted state is established than when the engine-pulsation non-transmitted state is established. A command-value reduction control operation is executed to drive and rotate the electric motor 86 by using the electric-current command value Iminst that is set to the smaller value, such that the rear-wheel-side drive-power distribution ratio X becomes the target distribution ratio value Xrtgt. Thus, the electric-current command value Iminst of the motor electric current Im is determined or set by using one of the electric-current command-value control maps MAPi_0, MAPi_1 which corresponds to the vibrational state of the transfer 30. Therefore, even when the vibrational state of the transfer 30 is changed, the reduction of the control accuracy of the motor rotation angle θm is suppressed whereby the reduction of the control accuracy of the rear-wheel-side drive-power distribution ratio Xr is suppressed.

Figure 9:
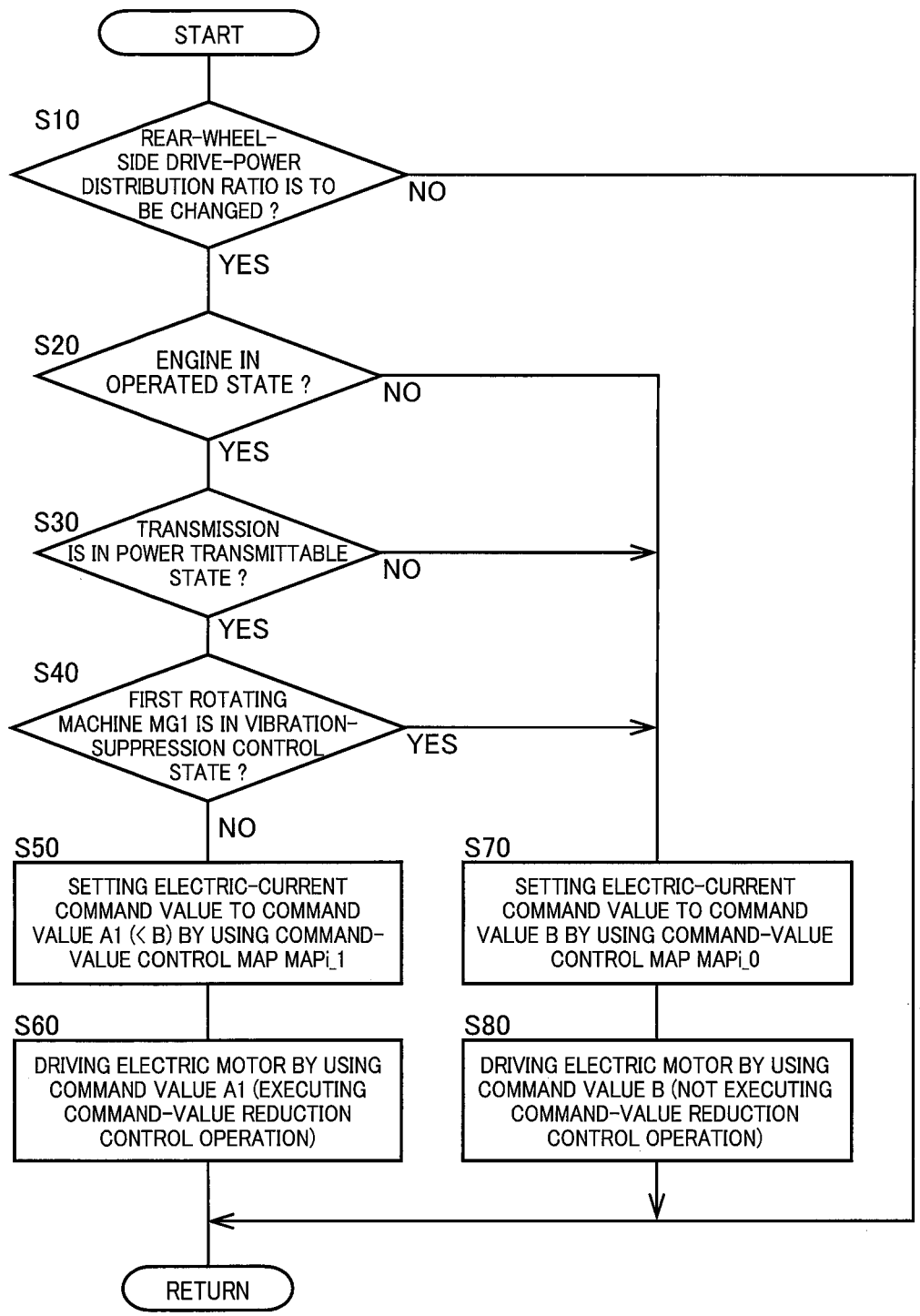
FIG. 9 is a flow chart showing, by way of example, a main part of a control routine executed by an electronic control apparatus shown in FIG. 1.

FIG. 9 is a flow chart showing, by way of example, a main part of a control routine executed by the electronic control apparatus 140 shown in FIG. 1. This control routine shown in the flow chart of FIG. 9 is executed in a repeated manner.

The control routine is initiated with step S10 corresponding to function of the distribution-ratio-change determination portion 146a, which is implemented to determine whether the rear-wheel-side drive-power distribution ratio Xr has been decided to be changed or not. When an affirmative determination is made at step S10, step S20 is implemented. When a negative determination is made at step S10, one cycle of execution of the control routine is terminated.

At step S20 corresponding to function of the engine-state determination portion 146b, it is determined whether the engine 12 is in the operated state or not. When an affirmative determination is made at step S20, step S30 is implemented. When a negative determination is made at step S20, the control flow goes to step S70.

At step S30 corresponding to function of the transmission-state determination portion 146c, it is determined whether the automatic transmission 28 is in the state in which the drive power from the engine 12 is transmittable to the transfer 30 or not. When an affirmative determination is made at step S30, step S40 is implemented. When a negative determination is made at step S30, the control flow goes to step S70.

At step S40 corresponding to function of the rotating-machine-state determination portion 146d, it is determined whether the first rotating machine MG1 is in the vibration-suppression control state or not. When an affirmative determination is made at step S40, the control flow goes to step S70. When a negative determination is made at step S40, step S50 is implemented.

At step S50 corresponding to function of the electric-motor control portion 146e, the electric-current command value Iminst of the motor electric current Im, by which the motor rotation angle θm is to be controlled to the target motor-rotation angle value θmtgt corresponding to the target distribution ratio value Xrtgt, is set to the command value A1 by using the electric-current command-value control map MAPi_1 for the engine-pulsation transmitted state. Step S50 is followed by step S60.

Step S60 corresponding to function of the electric-motor control portion 146e is implemented to cause the electric motor 86 to be driven and rotated with use of the command value A1 as the electric-current command value Iminst. After step S60 has been implemented, one cycle of execution of the control routine is terminated.

At step S70 corresponding to function of the electric-motor control portion 146e, the electric-current command value Iminst of the motor electric current Im, by which the motor rotation angle θm is to be controlled to the target motor rotation angle value θmtgt corresponding to the target distribution ratio value Xrtgt, is set to the command value B by using the electric-current command-value control map MAPi_0 for the engine-pulsation non-transmitted state. Step S70 is followed by step S80. It is noted that, where the target distribution ratio value Xrtgt is the same, namely, where the target motor rotation angle value θmtgt is the same, the command value A1 to which the electric-current command value Iminst is set at step S50 is smaller than the command value B to which the electric-current command value Iminst is set at step S70.

Step S80 corresponding to function of the electric-motor control portion 146e is implemented to cause the electric motor 86 to be driven and rotated with use of the command value B as the electric-current command value Iminst. After step S80 has been implemented, one cycle of execution of the control routine is terminated.

At step S60, the command-value reduction control operation is executed with use of the command value A1 as the electric-current command value Iminst which is smaller than the command value B used as the electric-current command value Iminst at step S80. On the other hand, at step S80, the command value B, which is larger than the command value A1 used at step S60, is used without execution of the command-value reduction control operation.

It is noted that, when a negative determination is made at step S10, the electric-current command value Iminst remains unchanged. That is, in a case in which the rear-wheel-side drive-power distribution ratio Xr is not changed, even when the above-described drive-power non-transmitted state (in which the drive power from the engine 12 is not being transmitted to the transfer 30) is switched to the above-described drive-power transmitted state, the command value B is maintained and the command-value reduction control operation is not executed, wherein the command value B is a command value to which the electric-current command value Iminst is set with use of the electric-current command-value control map MAPi_0 for the engine-pulsation non-transmitted state.

In the present embodiment, the electronic control apparatus 140 is configured, when changing the rear-wheel-side drive-power distribution ratio Xr to the target distribution ratio value Xrtgt, to set the electric-current command value Iminst for driving and rotating the electric motor 86, such that the electric-current command value Iminst is set depending on whether the drive power from the engine 12 is being transmitted to the transfer 30 or not. The electronic control apparatus 140 is configured, in the drive-power transmitted state in which the drive power from the engine 12 is being transmitted to the transfer 30, to execute the command-value reduction control operation for causing the electric motor 86 to be driven and rotated, with the electric-current command value Iminst being set to a value smaller than in the drive-power non-transmitted state in which the drive power from the engine 12 is not being transmitted to the transfer 30. In the drive-power transmitted state in which the drive power from the engine 12 is being transmitted to the transfer 30, the vibration applied to the transfer 30 is larger than in the drive-power non-transmitted state in which the drive power from the engine 12 is not being transmitted to the transfer 30. When the vibration applied to the transfer 30 is large, the electric motor 86 is more easily driven and rotated, than when the vibration is small. Therefore, in the drive-power transmitted state, the electric-current command value Iminst for driving and rotating the electric motor 86 is set to a value smaller than in the drive-power non-transmitted state. Thus, the electric-current command value Iminst is determined or set depending on the vibrational state of the transfer 30, thereby making it to possible to suppress the reduction of the control accuracy of the rear-wheel-side drive-power distribution ratio Xr even when the vibrational state of the transfer 30 is changed.

In the present embodiment, the automatic transmission 28 is provided between the engine 12 and the transfer 30, wherein the command-value reduction control operation is executed when the automatic transmission 28 is in the state in which the drive power is transmittable through the automatic transmission 28. Thus, the command-value reduction control operation is executed depending on whether the vibration due to automatic transmission 28 of the drive power from the engine 12 to the transfer 30 is present or absent, thereby making it to possible to suppress the reduction of the control accuracy of the rear-wheel-side drive-power distribution ratio Xr In the present embodiment, the drive power sources PU include the first rotating machine MG1, wherein the command-value reduction control operation is not executed when the first rotating machine MG1 is in the vibration-suppression control state for suppressing the pulsating component contained in the drive power from the engine 12, and is executed when the first rotating machine MG1 is not in the vibration-suppression control state. Thus, in a case in which transmission of the vibration arising from transmission of the drive power from the engine 12 to the transfer 30 is not suppressed by the control state of the first rotating machine MG1, the command-value reduction control operation is executed, thereby making it to possible to suppress the reduction of the control accuracy of the rear-wheel-side drive-power distribution ratio Xr In the present embodiment, the command-value reduction control operation is not executed in a case in which the rear-wheel-side drive-power distribution ratio Xr is not changed even when the drive-power non-transmitted state is switched to the drive-power transmitted state. When the drive-power non-transmitted state is switched to the drive-power transmitted state, the vibration applied to the transfer 30 is increased whereby the electric motor 86 becomes easier to be driven and rotated. However, even when the drive-power non-transmitted state is switched to the drive-power transmitted state, in a case in which the rear-wheel-side drive-power distribution ratio Xr is not changed, the motor rotation angle θm of the electric motor 86 is not changed and accordingly the electric motor 86 is neither driven nor rotated, so that there is no need for execution of the command-value reduction control operation.

In the present embodiment, the electric-current command value Iminst is set, by using the electric-current command-value control maps MAPi_0, MAPi_1 each of which defines the relationship between the target distribution ratio value Xrtgt and the electric-current command value Iminst, such that the electric-current command-value control map MAPi_1 as one of the electric-current command-value control maps MAPi_0, MAPi_1 is used to set the electric-current command value Iminst in the above-described drive-power transmitted state, and such that the electric-current command-value control map MAPi_0 as another one of the electric-current command-value control maps MAPi_0, MAPi_1, which is different from the electric-current command-value control map MAPi_1 as the one of the electric-current command-value control maps MAPi_0, MAPi_1, is used to set the electric-current command value Iminst in the above-described drive-power non-transmitted state. Thus, with use of one of the electric-current command-value control maps MAPi_0, MAPi_1, which is selected depending on which one of the drive-power transmitted state and the drive-power non-transmitted state is being established, it is possible to quickly determine or set the electric-current command value Iminst for driving and rotating the electric motor 86 so as to cause the rear-wheel-side drive-power distribution ratio Xr to become the target distribution ratio value Xrtgt. Further, the determination or setting of the electric-current command value Iminst can be made with a reduced computational load.

Second Embodiment

Figure 10:
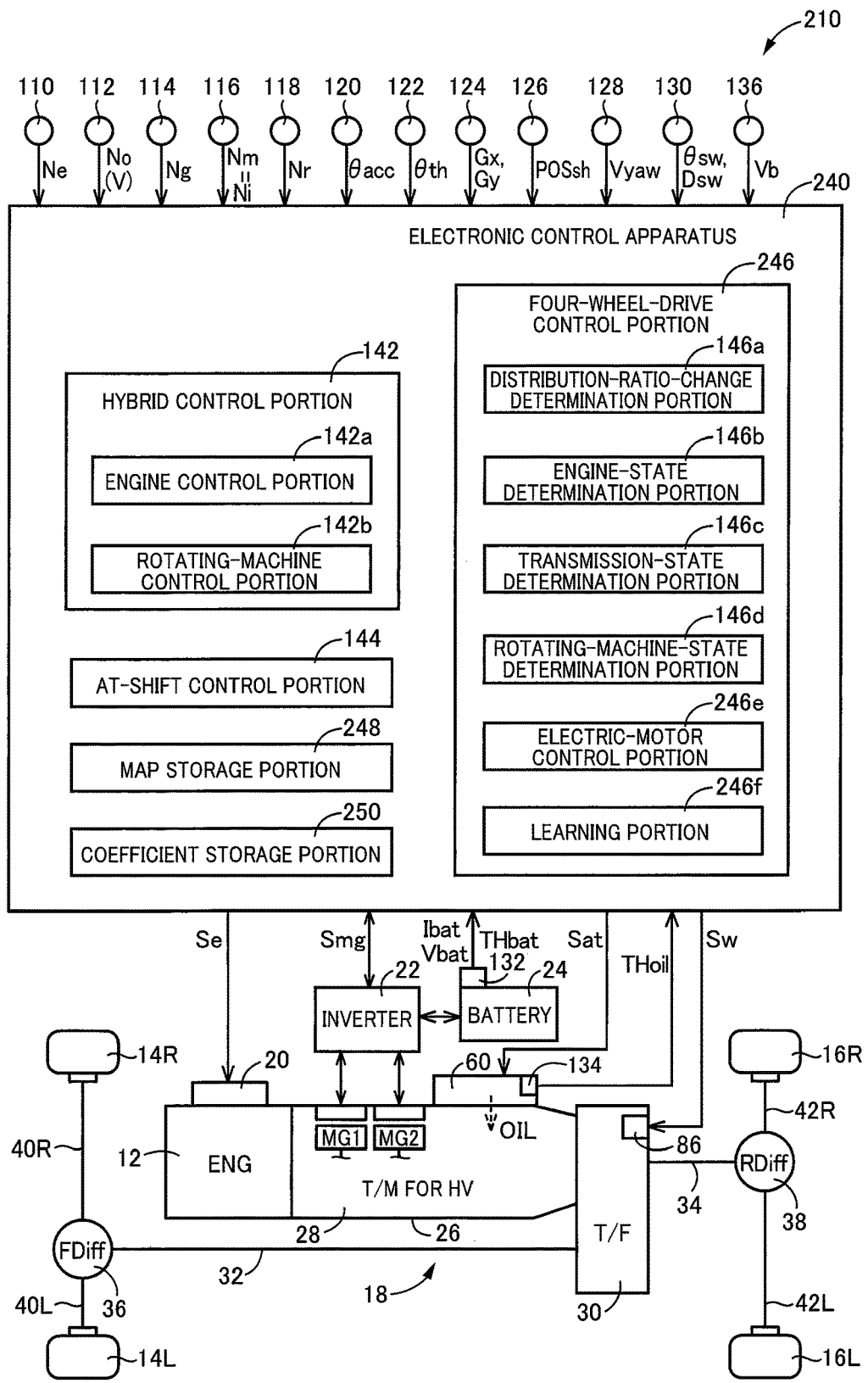
FIG. 10 is a view schematically showing a construction of a four-wheel drive vehicle constructed according to a second embodiment of the present invention, for explaining major portions of control functions that are provided to perform various control operations in the vehicle.

FIG. 10 is a view schematically showing a construction of a four-wheel drive vehicle 210 constructed according to a second embodiment of the present invention, for explaining major portions of control functions that are provided to perform various control operations in the vehicle 210. The four-wheel drive vehicle 210 of this second embodiment is substantially identical with the four-wheel drive vehicle 10 of the above-described first embodiment in terms of construction, and is different from the vehicle 10 of the first embodiment in that a vibration sensor 136 (that is not provided in the vehicle 10) is provided in the transfer 30 to detect a magnitude or amount of vibration of the transfer 30 and in that an electronic control apparatus 240 is provided in place of the electronic control apparatus 140. In the following description of this second embodiment, there will be described mainly elements different from those of the first embodiment. The same reference signs as used in the first embodiment will be used in the following second embodiment, to identify the functionally corresponding elements, and descriptions thereof are not provided.

The electronic control apparatus 240 receives an output signal of the vibration sensor 136 indicative of a transfer vibration value Vb that represents the magnitude or amount of vibration of the transfer 30, in addition to the above-described various output signals received by the electronic control apparatus 140 in the above-described first embodiment. For example, the vibration sensor 136 provided in the transfer 30 of the four-wheel drive vehicle 210 is an acceleration sensor, so that the transfer vibration value Vb representing the amount of vibration is an acceleration Vacc [m/sec$^2$] of vibration of the transfer 30. It is noted that the electronic control apparatus 240 corresponds to "control apparatus" recited in the appended claims.

The electronic control apparatus 240 is substantially identical with the electronic control apparatus 140 in the above-described first embodiment in terms of functions, and is different from the electronic control apparatus 140 in the first embodiment in that a map storage portion 248 is provided in place of the map storage portion 148, in that a coefficient storage portion 250 (that is not provided in the electronic control apparatus 140) is provided and in that a four-wheel-drive control portion 246 is provided in place of the four-wheel-drive control portion 146.

The map storage portion 248 stores therein, for example, the electric-current command-value control map MAPi_0 as in the above-described first embodiment, for determining or setting the electric-current command value Iminst for the engine-pulsation non-transmitted state.

The four-wheel-drive control portion 246 is substantially identical with the four-wheel-drive control portion 146 in the above-described first embodiment, in terms of function, and is different from the four-wheel-drive control portion 146 in that an electric-motor control portion 246e is provided in place of the electric-motor control portion 146e and in that a learning portion 246f (that is not provided in the four-wheel-drive control portion 146) is functionally provided.

The electric-motor control portion 246e is configured, when the rear-wheel-side drive-power distribution ratio Xr is to be changed, to determine or set the electric-current command value Iminst of the motor electric current Im, based on the electric-current command-value control map MAPi_0 stored in the map storage portion 248 and a predetermined coefficient k stored in the coefficient storage portion 250. The coefficient k stored in the coefficient storage portion 250 will be described later.

The learning portion 246f stores therein a predetermined relationship between the coefficient k and the transfer vibration value Vb, wherein the coefficient k corresponds to a ratio of the electric-current command value Iminst in the engine-pulsation transmitted state to the electric-current command value Iminst in the engine-pulsation non-transmitted state where the motor rotation angle θm is to be controlled to the same target motor rotation angle value θmtgt. The relationship between the coefficient k and the transfer vibration value Vb is pre-obtained by experimentation or predetermined by an appropriate design theory.

Figure 11:
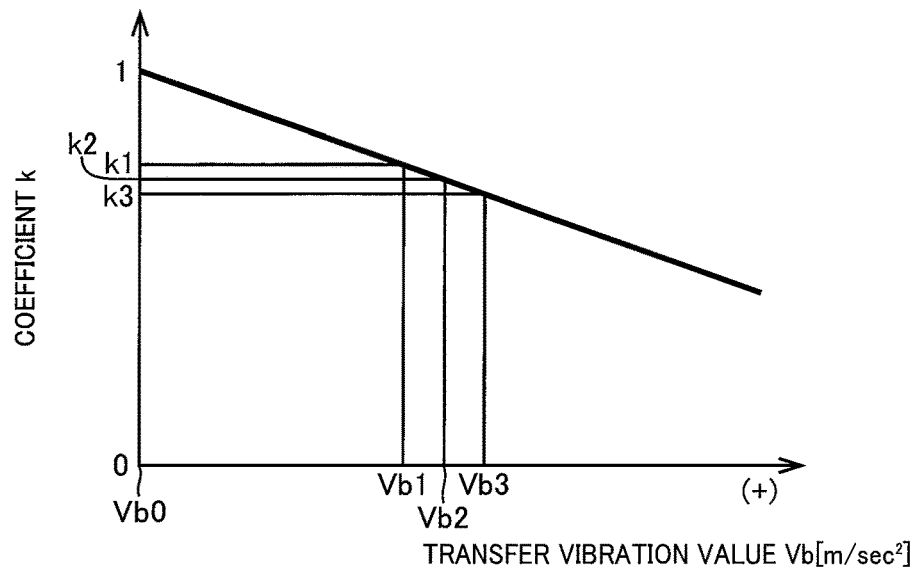
FIG. 11 is a view showing, by way of example, a relationship between a coefficient and a transfer vibration value.

FIG. 11 is a view showing, by way of example, the relationship between the coefficient k and the transfer vibration value Vb. As shown in FIG. 11, in the engine-pulsation non-transmitted state, the transfer vibration value Vb is a vibration value Vb0 and the coefficient k is 1.0. Meanwhile, in the engine-pulsation transmitted state, the worm wheel 94 is more easily rotated as the transfer vibration value Vb is increased, so that the coefficient k is gradually reduced with increase of the transfer vibration value Vb. That is, in the engine-pulsation transmitted state, the coefficient k is smaller than 1.0.

The learning portion 246f updates or changes the coefficient k stored in the coefficient storage portion 250, through a learning based on the transfer vibration value Vb, for example, each time when a predetermined learning period Ts [hour] elapses. The predetermined learning period Ts is a predetermined interval time period at which the learning is to be periodically executed for suppressing reduction of the control accuracy of the rear-wheel-side drive-power distribution ratio Xr. For example, when the rear-wheel-side drive-power distribution ratio Xr is to be changed in the engine-pulsation transmitted state, the coefficient k is learned based on an actual value of the transfer vibration value Vb and the relationship (that is shown by way of example in FIG. 11) between the coefficient k and the transfer vibration value Vb. In the example shown in FIG. 11, the coefficient k is learned to be set to a coefficient value k1 when the actual value of the transfer vibration value Vb is the vibration value Vb1, and is learned to be set to a coefficient value k2 when the actual value of the transfer vibration value Vb is the vibration value Vb2. Further, the coefficient k is learned to be set to a coefficient value k3 when the actual value of the transfer vibration value Vb is the vibration value Vb3. The coefficient value, to which the coefficient k is set through the learning, is stored as an updated coefficient k in the coefficient storage portion 250.

Figure 12:
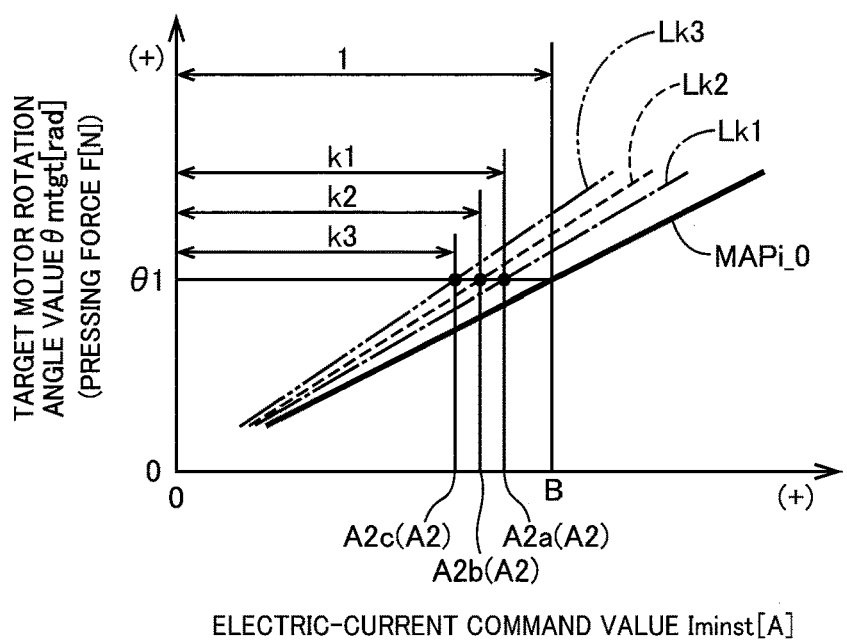
FIG. 12 is a view for explaining a method of setting an electric-current command value of a motor electric current that is to be supplied to an electric motor when a rear-wheel-side drive-power distribution ratio is to be changed.

FIG. 12 is a view for explaining a method of setting the electric-current command value Iminst of the motor electric current Im that is to be supplied to the electric motor 86 when the rear-wheel-side drive-power distribution ratio Xr is to be changed.

When the target motor rotation angle value θmtgt corresponding to the target distribution ratio value Xrtgt is to be changed to the angle value θ1, the electric-current command value Iminst of the motor electric current Im is set to a command value A2 as described below.

In the engine-pulsation non-transmitted state, the electric-current command value Iminst of the motor electric current Im is set to the command value B, based on the electric-current command-value control map MAPi_0 and the angle value θ1. On the other hand, in the engine-pulsation transmitted state, the electric-current command value Iminst of the motor electric current Im is set to the command value A2 that is obtained by multiplying the command value B (to which the electric-current command value Iminst is set in the engine-pulsation non-transmitted state) with the coefficient k that is stored in the coefficient storage portion 250. For example, as shown in FIG. 12, the electric-current command value Iminst of the motor electric current Im is set to a command value A2a as the command value A2 when the coefficient k is the coefficient value k1, and is set to a command value A2b as the command value A2 when the coefficient k is the coefficient value k2. Further, the electric-current command value Iminst is set to a command value A2c as the command value A2 when the coefficient k is the coefficient value k3.

FIG. 12 shows also straight lines Lk1, Lk2, Lk3. The straight line Lk1 corresponds to the electric-current command-value control map by which the electric-current command value Iminst of the motor electric current Im is set to a command value that is obtained by multiplying the command value determined or set with use of the electric-current command-value control map MAPi_0, by the coefficient value k1 as the coefficient k. Similarly, the straight line Lk2 corresponds to the electric-current command-value control map by which the electric-current command value Iminst is set to a command value that is obtained by multiplying the command value determined or set with use of the electric-current command-value control map MAPi_0, by the coefficient value k2 as the coefficient k. The straight line Lk3 corresponds to the electric-current command-value control map by which the electric-current command value Iminst is set to a command value that is obtained by multiplying the command value determined or set with use of the electric-current command-value control map MAPi_0, by the coefficient value k3 as the coefficient k. In the engine-pulsation transmitted state, setting the electric-current command value Iminst to the command value A2 by using the electric-current command-value control map MAPi_0 and the coefficient k corresponds to setting the electric-current command value Iminst to the command value A2 by using the electric-current command-value control map by which the electric-current command value Iminst is set to a command value that is obtained by multiplying the command value determined or set with use of the electric-current command-value control map MAPi_0, by the coefficient value. For example, when the coefficient k is the coefficient value k1, setting the electric-current command value Iminst to the command value A2 by using the electric-current command-value control map MAPi_0 and the coefficient value k1 corresponds to setting the electric-current command value Iminst to the command value A2 by using the electric-current command-value control map represented by the straight line Lk1. Similarly, when the coefficient k is the coefficient value k2 or k3, setting the electric-current command value Iminst to the command value A2 by using the electric-current command-value control map MAPi_0 and the coefficient value k2 or k3 corresponds to setting the electric-current command value Iminst to the command value A2 by using the electric-current command-value control map represented by the straight line Lk2 or Lk3.

FIG. 13 is a flow chart showing, by way of example, a main part of a control routine executed by the electronic control apparatus 240 shown in FIG. 10. This control routine shown in the flow chart of FIG. 13 is executed in a repeated manner.

The control routine shown in the flow chart of FIG. 13 is substantially the same as the control routine shown in the flow chart of FIG. 9 in the above-described first embodiment, and is different from the control routine of FIG. 9 in that steps S150 and S160 are provided in place of steps S50 and S60 and in that steps S200, S210 and S220 are additionally provided. In the following description regarding the control routine of FIG. 13, the same reference signs as used in the description regarding the control routine of FIG. 9 will be used to identify the functionally corresponding parts, and descriptions thereof are not provided.

At step S150 corresponding to function of the electric-motor control portion 246e, the electric-current command value Iminst of the motor electric current Im, by which the motor rotation angle θm is to be controlled to the target motor rotation angle value θmtgt corresponding to the target distribution ratio value Xrtgt, is set to the command value A2 that is obtained by multiplying the command value B determined or set with use of the electric-current command-value control map MAPi_0, by the coefficient k. Step S150 is followed by step S160. It is noted that, where the target distribution ratio value Xrtgt is the same, the command value A2 set at step S150 is smaller than the command value B set at step S70.

At step S160 corresponding to function of the electric-motor control portion 246e, the electric motor 86 is driven and rotated with use of the command value A2 as the electric-current command value Iminst. Step S160 is followed by step S200.

At step S200 corresponding to function of the learning portion 246f, it is determined whether or not the predetermined learning period Ts has elapsed since the learning made last time. When an affirmative determination is made at step S200, step S200 is followed by step S210. When a negative determination is made at step S200, one cycle of execution of the control routine is terminated.

At step S210 corresponding to function of the learning portion 246f, the transfer vibration value Vb in the engine-pulsation transmitted state is detected. Step S210 is followed by step S220.

At step S220 corresponding to function of the learning portion 246f, the coefficient k is learned. For example, the coefficient k is learned based on the relationship (shown in FIG. 11) between the coefficient k and the transfer vibration value Vb and the transfer vibration value Vb detected at step S210. In this instance, the coefficient k is updated to a coefficient value that is obtained through the learning. The updated coefficient k is stored in the coefficient storage portion 250. When the control routine of FIG. 13 is executed in the next cycle, step S150 is implemented to set to the command value A2 with use of the coefficient k that has been updated and stored in the coefficient storage portion 250.

The four-wheel drive vehicle 210 according to the present second embodiment is substantially identical in construction with the above-described four-wheel drive vehicle 10 according to the first embodiment, except for the arrangement of the four-wheel drive vehicle 10 in which one of the different electric-current command-value control maps MAPi_0, MAPi_1 is selected depending on which one of the drive-power transmitted state and the drive-power non-transmitted state is being established, and is used for the setting of the electric-current command value Iminst. Thus, owing to the construction substantially identical with that of the four-wheel drive vehicle 10, the four-wheel drive vehicle 210 provides substantially the same effects as those provided by the four-wheel drive vehicle 10.

In the present second embodiment, the electric-current command value Iminst is set to the command value B as the first command value in the drive-power non-transmitted state, and, when the command-value reduction control operation is to be executed, the electric-current command value Iminst is set to the second command value A1 as the second command value that is obtained by multiplying the command value B with the coefficient k. Thus, upon execution of the command-value reduction control operation, the setting of the electric-current command value Iminst to the second command value A1 in the engine-pulsation non-transmitted state is made with use of the coefficient k by which the command value B is multiplied. Therefore, as compared with an arrangement as in the above-described first embodiment in which the electric-current command-value control map MAPi_1 used in the engine-pulsation transmitted state is pre-stored in a storage portion, a required capacity of a storage portion can be made smaller, as long as the coefficient k can be stored in the storage portion.

In the present second embodiment, the coefficient k is changed through the learning based on the transfer vibration value Vb representing the magnitude or amount of vibration of the transfer 30. The vibrational state of the transfer 30 varies depending on a degree of easiness of transmission of the vibration from the engine 12 to the transfer 30 in each four-wheel drive vehicle 210. Therefore, the reduction of the control accuracy of the rear-wheel-side drive-power distribution ratio Xr is more suppressed owing to change of the coefficient k through the learning, as compared with in an arrangement in which the coefficient is not changed through the learning.

While the preferred embodiments of this invention have been described in detail by reference to the drawings, it is to be understood that the invention may be otherwise embodied.

In the above-described first and second embodiments, each of the four-wheel drive vehicles 10, 210 is a four-wheel drive vehicle based on a vehicle of FR (front engine and rear drive) system, and is a part-time four-wheel drive vehicle in which the two-wheel drive state and the four-wheel drive state are switchable to each other depending on the running state. Further, each of the four-wheel drive vehicles 10, 210 in the above-described first and second embodiments is a hybrid vehicle having the drive power sources in the form of the engine 12 and the first and second rotating machines MG1, MG2. However, these arrangements are not essential.

The present invention is applicable also to a four-wheel drive vehicle based on a vehicle of FF (front engine and front drive) system, a full-time four-wheel drive vehicle, a parallel-type hybrid vehicle in which drive powers of an engine and a rotating machine are to be transmitted to drive wheels, a series-type hybrid vehicle in which a drive power of a rotating machine, which is to be driven by an electric power of a battery and/or an electric power generated by a generator driven by a drive power of an engine, is to be transmitted to drive wheels, or a vehicle provided with a single drive power source PU in the form of an engine. It is noted that, in case of the four-wheel drive vehicle based on the vehicle of FF system, the front wheels serve as the main drive wheels while the rear wheels serve as the auxiliary drive wheels so that the front-wheel-side drive-power distribution ratio Xf is a ratio of the drive power transmitted to the main drive wheels. In case of the full-time four-wheel drive vehicle provided with a center differential gear device including a differential limiting clutch, for example, the drive-power distribution ratio Rx (that is the ratio of distribution of the drive power between the front wheels 14 and the rear wheels 16) is 50:50 when the differential limiting clutch is operated to limit or inhibit a differential motion of the center differential gear device, and the drive-power distribution ratio Rx is a predetermined ratio such as 30:70 when the differential limiting clutch is not operated.

In short, the present invention is applicable to any four-wheel drive vehicle including: (a) main drive wheels and auxiliary drive wheels; (b) at least one drive power source including an engine; (c) a drive-power distribution device including (c-i) a drive-power distribution clutch configured to distribute a drive power of the at least one drive power source to the main drive wheels and the auxiliary drive wheels, with a drive-power distribution ratio that is a ratio of distribution of the drive power between the auxiliary drive wheels and the main drive wheels, (c-ii) a worm-drive electric motor, (c-iii) a gear mechanism including (c-iii-1) a worm provided on a shaft of the worm-drive electric motor and (c-iii-2) a worm wheel meshing with the worm and (c-iv) a conversion mechanism configured to cause the drive-power distribution clutch to generate a pressing force by converting a rotary motion of the electric motor into a linear motion in a direction of an axis of the drive-power distribution clutch; and (d) a control apparatus configured to control a rotation angle of the worm-drive electric motor such that the drive-power distribution ratio becomes a target distribution ratio value.

In the above-described first and second embodiments, the change of the rear-wheel-side drive-power distribution ratio Xr as the drive-power distribution ratio Xr is made by determining or setting the electric-current command value Iminst and controlling the motor rotation angle θm as the rotation angle of the electric motor 86 depending on the amount of the electric-current command value Iminst. However, this arrangement is not essential. For example, the change of the rear-wheel-side drive-power distribution ratio Xr may be made by determining or setting the electric-current command value Iminst and controlling a number of rotations [times] of the electric motor 86 depending on the amount of the electric-current command value Iminst. In this modified arrangement in which the number of rotations of the electric motor 86 is controlled, the rotation angle of the worm wheel 94 is controlled to a discrete angle value that is dependent on the number of rotations of the electric motor 86 whereby the drive-power distribution ratio Rx is controlled to a discrete ratio value. That is, in the present invention, the rotation of the electric motor 86 may be controlled in either a continuous or discrete manner as long as the drive-power distribution ratio Rx can be controlled to the target distribution ratio value Xrtgt.

In the above-described first and second embodiments, the automatic transmission 28 includes the continuously-variable transmission portion 44 and the step-variable transmission portion 46 that are disposed in series, and the automatic transmission 28 is disposed between the engine 12 and the transfer 30. However, this arrangement is not essential. For example, the automatic transmission 28 may be a known planetary-gear type automatic transmission, a known synchronous-meshing parallel-two-shaft-type transmission including DCT (dual clutch transmission), a known belt-type continuously variable transmission or an electrically-operated continuously variable transmission. Further, the present invention is applicable also to a four-wheel drive vehicle that is not provided with the automatic transmission 28. In the four-wheel drive vehicle not provided with the automatic transmission 28, too, the reduction of the control accuracy of the rear-wheel-side drive-power distribution ratio Xr can be suppressed even with the vibrational state of the transfer 30 being changed, by setting the electric-current command value Iminst to a smaller value in the engine-pulsation transmitted state than in the engine-pulsation non-transmitted state.

In the above-described first and second embodiments, the command-value reduction control operation is executed when the first rotating machine MG1 is not in the vibration-suppression control state. However, this arrangement is not essential. The command-value reduction control operation may be executed even when the first rotating machine MG1 is in the vibration-suppression control state, because there could be a case in which the pulsation of the drive force cannot be completely cancelled even when the first rotating machine MG1 is in the vibration-suppression control state.

In the above-described first and second embodiments, the command-value reduction control operation is executed when the first rotating machine MG1 is not in the vibration-suppression control state, and is not executed when the first rotating machine MG1 is in the vibration-suppression control state. However, this arrangement is not essential. For example, the command-value reduction control operation may not be executed when the second rotating machine MG2 is in the vibration-suppression control state even if the first rotating machine MG1 is not in the vibration-suppression control state. That is, it is possible to employ an arrangement in which the command-value reduction control operation is not executed when at least one of vehicle-drive rotating machines as the drive power sources PU of the four-wheel drive vehicle is in the vibration-suppression control state, and is executed when any one of the vehicle-drive rotating machines is not in the vibration-suppression control state, because the vibration transmitted from the engine 12 to the transfer 30 is made larger when any one of the vehicle-drive rotating machines is not in the vibration-suppression control state, than when at least one of the vehicle-drive rotating machines is in the vibration-suppression control state.

In the above-described first embodiment, the determination or setting of the electric-current command value Iminst is made by using the electric-current command-value control maps MAPi_0, MAPi_1 each defining the relationship between the target distribution ratio value Xrtgt and the electric-current command value Iminst. However, this arrangement is not essential. For example, the determination or setting of the electric-current command value Iminst may be made by using predetermined numerical expressions each defining the relationship between the target distribution ratio value Xrtgt and the electric-current command value Iminst in a corresponding one of the engine-pulsation non-transmitted state and the engine-pulsation transmitted state. Similarly, in the above-described second embodiment, the determination or setting of the electric-current command value Iminst may be made in the engine-pulsation non-transmitted state, for example, by using a predetermined numerical expression defining the relationship between the target distribution ratio value Xrtgt and the electric-current command value Iminst.

In the above-described second embodiment, the predetermined learning period Ts is a predetermined time period, namely, is defined by a length of time. However, this arrangement is not essential. For example, the predetermined learning period Ts may be defined by a certain running distance of the four-wheel drive vehicle 210. Further, the learning may be executed only once, either before or after delivery of the vehicle 210 from the factory, or after delivery of the vehicle 210 in case of the repair.

In the above-described second embodiment, the transfer vibration value Vb representing the amount of vibration is the acceleration Vacc [m/sec$^2$] of vibration of the transfer 30. However, this arrangement is not essential. For example, the vibration sensor 136 may be a speed sensor and the transfer vibration value Vb may be a speed Vv [mm/sec] of vibration of the transfer 30.

In the above-described first and second embodiments, the front-wheel drive clutch 70 of the transfer 30 is constructed such that, when the electric motor 86 is rotated, the piston 84 is moved through the cam mechanism 90 in a direction toward the frictional engagement elements 82, so as to press the frictional engagement elements 82. However, this arrangement is not essential. For example, the front-wheel drive clutch 70 may include a ball screw configured to covert a rotational motion into a linear motion, such that the piston 84 is moved, upon rotation of the electric motor 86, through the ball screw, in the direction toward the frictional engagement elements 82, so as to press the frictional engagement elements 82.

It is to be understood that the embodiments described above are given for illustrative purpose only, and that the present invention may be embodied with various modifications and improvements which may occur to those skilled in the art.

NOMENCLATURE OF ELEMENTS

10; 210: four-wheel drive vehicle
12: engine
14 (14R, 14L): front wheels (auxiliary drive wheels)
16 (16R, 16L): rear wheels (main drive wheels)
28: automatic transmission (transmission)
30: transfer (drive-power distribution device)
70: front-wheel drive clutch (drive-power distribution clutch)
86: electric motor (worm-drive electric motor)
86*a*: motor shaft (shaft)
88: worm gear (gear mechanism)
90: cam mechanism (conversion mechanism)
92: worm
94: worm wheel
140; 240: electronic control apparatus (control apparatus)
CL1: rotary axis (axis)
F: pressing force
Iminst: electric-current command value
k: coefficient
MAPi_0: electric-current command-value control map (control map)
MAPi_1: electric-current command-value control map (control map)
MG1: first rotating machine (vehicle-drive rotating machine)
MG2: second rotating machine (vehicle-drive rotating machine)
PU: drive power source
Xr: rear-wheel-side drive-power distribution ratio (drive-power distribution ratio)
Xrtgt: target distribution ratio value (target distribution ratio value)

What is claimed is:

1. A four-wheel drive vehicle comprising:
   main drive wheels and auxiliary drive wheels;
   a drive power source including an engine and a vehicle-drive rotating machine;
   a drive-power distribution device including (i) a drive-power distribution clutch configured to distribute a drive power from the drive power source to the main drive wheels and the auxiliary drive wheels, with a drive-power distribution ratio that is a ratio of distribution of the drive power between the auxiliary drive wheels and the main drive wheels, (ii) a worm-drive electric motor that is provided apart from the vehicle-drive rotating machine, (iii) a gear mechanism including (iii-1) a worm provided on a shaft of the worm-drive electric motor and (iii-2) a worm wheel meshing with the worm and (iv) a conversion mechanism configured to cause a pressing force to be generated in the drive-power distribution clutch by converting a rotary motion of the worm-drive electric motor into a linear motion in a direction of an axis of the drive-power distribution clutch; and
   a control apparatus configured to control rotation of the worm-drive electric motor such that the drive-power distribution ratio becomes a target distribution ratio value,
   wherein the control apparatus is configured, when changing the drive-power distribution ratio to the target distribution ratio value, to set an electric-current command value that is proportional to power provided for driving and rotating the worm-drive electric motor, such that the electric-current command value is set depending on whether the drive power from the engine is being transmitted to the drive-power distribution device or not, and
   wherein the control apparatus is configured, in a drive-power transmitted state in which the drive power from the engine is being transmitted to the drive-power distribution device, to execute a command-value reduction control operation for causing the worm-drive electric motor to be driven and rotated, with the electric-current command value being set to a value smaller than in a drive-power non-transmitted state in which the drive power from the engine is not being transmitted to the drive-power distribution device.

2. The four-wheel drive vehicle according to claim 1, comprising a transmission provided between the engine and the drive-power distribution device,
   wherein the control apparatus is configured to execute the command-value reduction control operation when the transmission is in a state in which the drive power is transmittable through the transmission.

3. The four-wheel drive vehicle according to claim 1,
   wherein the control apparatus is configured to not execute the command-value reduction control operation when the vehicle-drive rotating machine is in a vibration-suppression control state for suppressing a pulsating component contained in the drive power from the engine, and is configured to execute the command-value reduction control operation when the vehicle-drive rotating machine is not in the vibration-suppression control state.

4. The four-wheel drive vehicle according to claim 1,
   wherein the control apparatus is configured to not execute the command-value reduction control operation in a case in which the drive-power distribution ratio is not changed even when the drive-power non-transmitted state is switched to the drive-power transmitted state.

5. The four-wheel drive vehicle according to claim 1,
   wherein the control apparatus is configured to set the electric-current command value, by using control maps each of which defines a relationship between the target distribution ratio value and the electric-current command value, such that one of the control maps is used to set the electric-current command value in the drive-power transmitted state, and such that another one of the control maps, which is different from the one of the control maps, is used to set the electric-current command value in the drive-power non-transmitted state.

6. The four-wheel drive vehicle according to claim 1,
wherein the control apparatus is configured, in the drive-power non-transmitted state, to set the electric-current command value to a first command value, and
wherein the control apparatus is configured, when executing the command-value reduction control operation, to set the electric-current command value to a second command value that is obtained by multiplying the first command value with a coefficient.

7. The four-wheel drive vehicle according to claim 6,
wherein the control apparatus is configured to change the coefficient through a learning based on a vibration value of the drive-power distribution device.

* * * * *